(12) United States Patent
Akhbari et al.

(10) Patent No.: US 11,216,681 B2
(45) Date of Patent: Jan. 4, 2022

(54) FAKE FINGER DETECTION BASED ON TRANSIENT FEATURES

(71) Applicant: InvenSense, Inc., San Jose, CA (US)

(72) Inventors: Sina Akhbari, San Jose, CA (US); Romain Fayolle, Grenoble (FR); Daniela Hall, Eybens (FR)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/911,136

(22) Filed: Jun. 24, 2020

(65) Prior Publication Data
US 2020/0410268 A1 Dec. 31, 2020

Related U.S. Application Data

(60) Provisional application No. 62/866,510, filed on Jun. 25, 2019.

(51) Int. Cl.
*G06K 9/00* (2006.01)

(52) U.S. Cl.
CPC ....... *G06K 9/00906* (2013.01); *G06K 9/0002* (2013.01); *G06K 9/00067* (2013.01); *G06K 9/00087* (2013.01)

(58) Field of Classification Search
CPC ........... G06K 9/00906; G06K 9/00087; G06K 9/00067; G06K 9/0002; G06K 9/00114; G06K 9/4604; G06K 9/6267; G06K 9/6292
See application file for complete search history.

(56) References Cited

U.S. PATENT DOCUMENTS

| | | | |
|---|---|---|---|
| 5,575,286 A | 11/1996 | Weng et al. |
| 5,684,243 A | 11/1997 | Gururaja et al. |
| 5,808,967 A | 9/1998 | Yu et al. |
| 5,867,302 A | 2/1999 | Fleming |
| 5,911,692 A | 6/1999 | Hussain et al. |
| 6,071,239 A | 6/2000 | Cribbs et al. |
| 6,104,673 A | 8/2000 | Cole et al. |

(Continued)

FOREIGN PATENT DOCUMENTS

| | | |
|---|---|---|
| CN | 1826631 A | 8/2006 |
| CN | 102159334 A | 8/2011 |

(Continued)

OTHER PUBLICATIONS

Tang, et al., "Pulse-Echo Ultrasonic Fingerprint Sensor on a Chip", IEEE Transducers, Anchorage, Alaska, USA, Jun. 21-25, 2015, pp. 674-677.

(Continued)

*Primary Examiner* — Premal R Patel

(57) ABSTRACT

In a method for determining whether a finger is a real finger at an ultrasonic fingerprint sensor, a sequence of images of a fingerprint of a finger are captured at an ultrasonic fingerprint sensor, wherein the sequence of images includes images captured during a change in contact state between the finger and the ultrasonic fingerprint sensor. A plurality of transient features of the finger is extracted from the sequence of images. A classifier is applied to the plurality of transient features to classify the finger as one of a real finger and a fake finger. It is determined whether the finger is a real finger based on an output of the classifier.

17 Claims, 10 Drawing Sheets

(56) References Cited

U.S. PATENT DOCUMENTS

| | | |
|---|---|---|
| 6,289,112 B1 | 9/2001 | Jain et al. |
| 6,292,576 B1 | 9/2001 | Brownlee |
| 6,350,652 B1 | 2/2002 | Libera et al. |
| 6,428,477 B1 | 8/2002 | Mason |
| 6,483,932 B1 * | 11/2002 | Martinez ............ G06K 9/00026 283/68 |
| 6,500,120 B1 | 12/2002 | Anthony |
| 6,676,602 B1 | 1/2004 | Barnes et al. |
| 6,736,779 B1 | 5/2004 | Sano et al. |
| 7,067,962 B2 | 6/2006 | Scott |
| 7,109,642 B2 | 9/2006 | Scott |
| 7,243,547 B2 | 7/2007 | Cobianu et al. |
| 7,257,241 B2 | 8/2007 | Lo |
| 7,400,750 B2 | 7/2008 | Nam |
| 7,433,034 B1 | 10/2008 | Huang |
| 7,459,836 B2 | 12/2008 | Scott |
| 7,471,034 B2 | 12/2008 | Schlote-Holubek et al. |
| 7,489,066 B2 | 2/2009 | Scott et al. |
| 7,634,117 B2 | 12/2009 | Cho |
| 7,739,912 B2 | 6/2010 | Schneider et al. |
| 8,018,010 B2 | 9/2011 | Tigli et al. |
| 8,139,827 B2 | 3/2012 | Schneider et al. |
| 8,255,698 B2 | 8/2012 | Li et al. |
| 8,311,514 B2 | 11/2012 | Bandyopadhyay et al. |
| 8,335,356 B2 | 12/2012 | Schmitt |
| 8,433,110 B2 | 4/2013 | Kropp et al. |
| 8,508,103 B2 | 8/2013 | Schmitt et al. |
| 8,515,135 B2 | 8/2013 | Clarke et al. |
| 8,666,126 B2 | 3/2014 | Lee et al. |
| 8,703,040 B2 | 4/2014 | Liufu et al. |
| 8,723,399 B2 | 5/2014 | Sammoura et al. |
| 8,805,031 B2 | 8/2014 | Schmitt |
| 9,056,082 B2 | 6/2015 | Liautaud et al. |
| 9,070,861 B2 | 6/2015 | Bibl et al. |
| 9,224,030 B2 | 12/2015 | Du et al. |
| 9,245,165 B2 | 1/2016 | Slaby et al. |
| 9,424,456 B1 | 8/2016 | Kamath Koteshwara et al. |
| 9,572,549 B2 | 2/2017 | Belevich et al. |
| 9,582,102 B2 | 2/2017 | Setlak |
| 9,582,705 B2 | 2/2017 | Du et al. |
| 9,607,203 B1 | 3/2017 | Yazdandoost et al. |
| 9,607,206 B2 | 3/2017 | Schmitt et al. |
| 9,613,246 B1 | 4/2017 | Gozzini et al. |
| 9,665,763 B2 | 5/2017 | Du et al. |
| 9,747,488 B2 | 8/2017 | Yazdandoost et al. |
| 9,785,819 B1 | 10/2017 | Oreifej |
| 9,815,087 B2 | 11/2017 | Ganti et al. |
| 9,817,108 B2 | 11/2017 | Kuo et al. |
| 9,818,020 B2 | 11/2017 | Schuckers et al. |
| 9,881,195 B2 | 1/2018 | Lee et al. |
| 9,881,198 B2 | 1/2018 | Lee et al. |
| 9,898,640 B2 | 2/2018 | Ghavanini |
| 9,904,836 B2 | 2/2018 | Yeke Yazdandoost et al. |
| 9,909,225 B2 | 3/2018 | Lee et al. |
| 9,922,235 B2 | 3/2018 | Cho et al. |
| 9,934,371 B2 | 4/2018 | Hong et al. |
| 9,939,972 B2 | 4/2018 | Shepelev et al. |
| 9,953,205 B1 | 4/2018 | Rasmussen et al. |
| 9,959,444 B2 | 5/2018 | Young et al. |
| 9,967,100 B2 | 5/2018 | Hong et al. |
| 9,983,656 B2 | 5/2018 | Merrell et al. |
| 9,984,271 B1 | 5/2018 | King et al. |
| 10,275,638 B1 | 4/2019 | Yousefpor et al. |
| 10,315,222 B2 | 6/2019 | Salvia et al. |
| 10,387,704 B2 | 8/2019 | Dagan et al. |
| 10,461,124 B2 | 10/2019 | Berger et al. |
| 10,478,858 B2 | 11/2019 | Lasiter et al. |
| 10,515,255 B2 | 12/2019 | Strohmann et al. |
| 10,539,539 B2 | 1/2020 | Garlepp et al. |
| 10,600,403 B2 | 3/2020 | Garlepp et al. |
| 10,656,255 B2 | 5/2020 | Ng et al. |
| 10,670,716 B2 | 6/2020 | Apte et al. |
| 10,706,835 B2 | 7/2020 | Garlepp et al. |
| 10,755,067 B2 | 8/2020 | De Foras et al. |
| 2002/0135273 A1 | 9/2002 | Mauchamp et al. |
| 2003/0013955 A1 | 1/2003 | Poland |
| 2004/0085858 A1 | 5/2004 | Khuri-Yakub et al. |
| 2004/0122316 A1 | 6/2004 | Satoh et al. |
| 2004/0174773 A1 | 9/2004 | Thomenius et al. |
| 2005/0023937 A1 | 2/2005 | Sashida et al. |
| 2005/0057284 A1 | 3/2005 | Wodnicki |
| 2005/0100200 A1 | 5/2005 | Abiko et al. |
| 2005/0110071 A1 | 5/2005 | Ema et al. |
| 2005/0146240 A1 | 7/2005 | Smith et al. |
| 2005/0148132 A1 | 7/2005 | Wodnicki et al. |
| 2005/0162040 A1 | 7/2005 | Robert |
| 2006/0052697 A1 | 3/2006 | Hossack et al. |
| 2006/0079777 A1 | 4/2006 | Karasawa |
| 2006/0280346 A1 * | 12/2006 | Machida ............ G06K 9/00026 382/124 |
| 2007/0046396 A1 | 3/2007 | Huang |
| 2007/0047785 A1 | 3/2007 | Jang et al. |
| 2007/0073135 A1 | 3/2007 | Lee et al. |
| 2007/0202252 A1 | 8/2007 | Sasaki |
| 2007/0215964 A1 | 9/2007 | Khuri-Yakub et al. |
| 2007/0223791 A1 * | 9/2007 | Shinzaki ............ G06K 9/00026 382/124 |
| 2007/0230754 A1 | 10/2007 | Jain et al. |
| 2008/0125660 A1 | 5/2008 | Yao et al. |
| 2008/0150032 A1 | 6/2008 | Tanaka |
| 2008/0194053 A1 | 8/2008 | Huang |
| 2008/0240523 A1 | 10/2008 | Benkley et al. |
| 2009/0005684 A1 | 1/2009 | Kristoffersen et al. |
| 2009/0182237 A1 | 7/2009 | Angelsen et al. |
| 2009/0274343 A1 | 11/2009 | Clarke |
| 2009/0303838 A1 | 12/2009 | Svet |
| 2010/0030076 A1 | 2/2010 | Vortman et al. |
| 2010/0046810 A1 | 2/2010 | Yamada |
| 2010/0113952 A1 | 5/2010 | Raguin et al. |
| 2010/0168583 A1 | 7/2010 | Dausch et al. |
| 2010/0195851 A1 | 8/2010 | Buccafusca |
| 2010/0201222 A1 | 8/2010 | Adachi et al. |
| 2010/0202254 A1 | 8/2010 | Roest et al. |
| 2010/0239751 A1 | 9/2010 | Regniere |
| 2010/0251824 A1 | 10/2010 | Schneider et al. |
| 2010/0256498 A1 | 10/2010 | Tanaka |
| 2010/0278008 A1 | 11/2010 | Ammar |
| 2011/0285244 A1 | 11/2011 | Lewis et al. |
| 2011/0291207 A1 | 12/2011 | Martin et al. |
| 2012/0016604 A1 | 1/2012 | Irving et al. |
| 2012/0092026 A1 | 4/2012 | Liautaud et al. |
| 2012/0095335 A1 | 4/2012 | Sverdlik et al. |
| 2012/0095347 A1 | 4/2012 | Adam et al. |
| 2012/0147698 A1 | 6/2012 | Wong et al. |
| 2012/0224041 A1 * | 9/2012 | Monden .................... G06K 9/34 348/77 |
| 2012/0232396 A1 | 9/2012 | Tanabe |
| 2012/0238876 A1 | 9/2012 | Tanabe et al. |
| 2012/0263355 A1 | 10/2012 | Monden |
| 2012/0279865 A1 | 11/2012 | Regniere et al. |
| 2012/0288641 A1 | 11/2012 | Diatezua et al. |
| 2012/0300988 A1 | 11/2012 | Ivanov et al. |
| 2013/0051179 A1 | 2/2013 | Hong |
| 2013/0064043 A1 | 3/2013 | Degertekin et al. |
| 2013/0127297 A1 | 5/2013 | Bautista et al. |
| 2013/0127592 A1 | 5/2013 | Fyke et al. |
| 2013/0133428 A1 | 5/2013 | Lee et al. |
| 2013/0201134 A1 | 8/2013 | Schneider et al. |
| 2013/0271628 A1 | 10/2013 | Ku et al. |
| 2013/0294202 A1 | 11/2013 | Hajati |
| 2014/0060196 A1 | 3/2014 | Falter et al. |
| 2014/0117812 A1 | 5/2014 | Hajati |
| 2014/0176332 A1 | 6/2014 | Alameh et al. |
| 2014/0208853 A1 | 7/2014 | Onishi et al. |
| 2014/0219521 A1 | 8/2014 | Schmitt et al. |
| 2014/0232241 A1 | 8/2014 | Hajati |
| 2014/0265721 A1 | 9/2014 | Robinson et al. |
| 2014/0294262 A1 * | 10/2014 | Schuckers ............ G06K 9/00073 382/125 |
| 2014/0313007 A1 | 10/2014 | Harding |
| 2014/0355387 A1 | 12/2014 | Kitchens et al. |
| 2015/0036065 A1 | 2/2015 | Yousefpor et al. |
| 2015/0049590 A1 | 2/2015 | Rowe et al. |
| 2015/0087991 A1 | 3/2015 | Chen et al. |

(56) References Cited

U.S. PATENT DOCUMENTS

| | | |
|---|---|---|
| 2015/0097468 A1 | 4/2015 | Hajati et al. |
| 2015/0145374 A1 | 5/2015 | Xu et al. |
| 2015/0164473 A1 | 6/2015 | Kim et al. |
| 2015/0165479 A1 | 6/2015 | Lasiter et al. |
| 2015/0169136 A1 | 6/2015 | Ganti et al. |
| 2015/0189136 A1 | 7/2015 | Chung et al. |
| 2015/0198699 A1 | 7/2015 | Kuo et al. |
| 2015/0206738 A1 | 7/2015 | Rastegar |
| 2015/0213180 A1 | 7/2015 | Herberholz |
| 2015/0220767 A1 | 8/2015 | Yoon et al. |
| 2015/0241393 A1 | 8/2015 | Ganti et al. |
| 2015/0261261 A1 | 9/2015 | Bhagavatula et al. |
| 2015/0286312 A1 | 10/2015 | Kang et al. |
| 2015/0301653 A1 | 10/2015 | Urushi |
| 2015/0345987 A1 | 12/2015 | Hajati |
| 2015/0371398 A1 | 12/2015 | Qiao et al. |
| 2016/0051225 A1 | 2/2016 | Kim et al. |
| 2016/0063294 A1 | 3/2016 | Du et al. |
| 2016/0063300 A1 | 3/2016 | Du et al. |
| 2016/0070967 A1* | 3/2016 | Du .............................. G06T 7/32 382/124 |
| 2016/0070968 A1 | 3/2016 | Gu et al. |
| 2016/0086010 A1 | 3/2016 | Merrell et al. |
| 2016/0092715 A1 | 3/2016 | Yazdandoost et al. |
| 2016/0092716 A1 | 3/2016 | Yazdandoost et al. |
| 2016/0100822 A1 | 4/2016 | Kim et al. |
| 2016/0107194 A1 | 4/2016 | Panchawagh et al. |
| 2016/0117541 A1 | 4/2016 | Lu et al. |
| 2016/0180142 A1 | 6/2016 | Riddle et al. |
| 2016/0326477 A1 | 11/2016 | Fernandez-Alcon et al. |
| 2016/0350573 A1 | 12/2016 | Kitchens et al. |
| 2016/0358003 A1 | 12/2016 | Shen et al. |
| 2017/0004352 A1* | 1/2017 | Jonsson .............. G06K 9/00013 |
| 2017/0330552 A1 | 1/2017 | Garlepp et al. |
| 2017/0032485 A1 | 2/2017 | Vemury |
| 2017/0075700 A1 | 3/2017 | Abudi et al. |
| 2017/0100091 A1 | 4/2017 | Eigil et al. |
| 2017/0110504 A1 | 4/2017 | Panchawagh et al. |
| 2017/0119343 A1 | 5/2017 | Pintoffl |
| 2017/0124374 A1 | 5/2017 | Rowe et al. |
| 2017/0168543 A1 | 6/2017 | Dai et al. |
| 2017/0185821 A1 | 6/2017 | Chen et al. |
| 2017/0194934 A1 | 7/2017 | Shelton et al. |
| 2017/0200054 A1* | 7/2017 | Du ........................ G06K 9/001 |
| 2017/0219536 A1 | 8/2017 | Koch et al. |
| 2017/0231534 A1 | 8/2017 | Agassy et al. |
| 2017/0255338 A1 | 9/2017 | Medina et al. |
| 2017/0293791 A1 | 10/2017 | Mainguet et al. |
| 2017/0316243 A1 | 11/2017 | Ghavanini |
| 2017/0316248 A1 | 11/2017 | He et al. |
| 2017/0322290 A1 | 11/2017 | Ng |
| 2017/0322291 A1 | 11/2017 | Salvia et al. |
| 2017/0322292 A1 | 11/2017 | Salvia et al. |
| 2017/0322305 A1 | 11/2017 | Apte et al. |
| 2017/0323133 A1 | 11/2017 | Tsai |
| 2017/0326590 A1 | 11/2017 | Daneman |
| 2017/0326591 A1 | 11/2017 | Apte et al. |
| 2017/0326593 A1 | 11/2017 | Garlepp et al. |
| 2017/0326594 A1 | 11/2017 | Berger et al. |
| 2017/0328866 A1 | 11/2017 | Apte et al. |
| 2017/0328870 A1 | 11/2017 | Garlepp et al. |
| 2017/0330012 A1 | 11/2017 | Salvia et al. |
| 2017/0330553 A1 | 11/2017 | Garlepp et al. |
| 2017/0357839 A1 | 12/2017 | Yazdandoost et al. |
| 2018/0025202 A1* | 1/2018 | Ryshtun .............. G06K 9/0012 382/124 |
| 2018/0032788 A1* | 2/2018 | Krenzer .............. G06K 9/00006 |
| 2018/0101711 A1 | 4/2018 | D'Souza et al. |
| 2018/0107852 A1* | 4/2018 | Fenrich ................ G06K 9/0008 |
| 2018/0129849 A1 | 5/2018 | Strohmann et al. |
| 2018/0129857 A1 | 5/2018 | Bonev |
| 2018/0206820 A1 | 7/2018 | Anand et al. |
| 2018/0225495 A1 | 8/2018 | Jonsson et al. |
| 2018/0229267 A1 | 8/2018 | Ono et al. |
| 2018/0276443 A1 | 9/2018 | Strohmann et al. |
| 2018/0349663 A1 | 12/2018 | Garlepp et al. |
| 2018/0357457 A1 | 12/2018 | Rasmussen et al. |
| 2018/0369866 A1 | 12/2018 | Sammoura et al. |
| 2018/0373913 A1 | 12/2018 | Panchawagh et al. |
| 2019/0005300 A1 | 1/2019 | Garlepp et al. |
| 2019/0018123 A1 | 1/2019 | Narasimha-Iyer et al. |
| 2019/0057267 A1 | 2/2019 | Kitchens et al. |
| 2019/0073507 A1 | 3/2019 | D'Souza et al. |
| 2019/0095015 A1 | 3/2019 | Han et al. |
| 2019/0102046 A1 | 4/2019 | Miranto et al. |
| 2019/0130083 A1* | 5/2019 | Agassy .............. G06K 9/00087 |
| 2019/0171858 A1 | 6/2019 | Ataya et al. |
| 2019/0188441 A1 | 6/2019 | Hall et al. |
| 2019/0188442 A1 | 6/2019 | Flament et al. |
| 2019/0325185 A1 | 10/2019 | Tang |
| 2020/0030850 A1 | 1/2020 | Apte et al. |
| 2020/0050816 A1 | 2/2020 | Tsai |
| 2020/0050817 A1 | 2/2020 | Salvia et al. |
| 2020/0050828 A1 | 2/2020 | Li et al. |
| 2020/0074135 A1 | 3/2020 | Garlepp et al. |
| 2020/0158694 A1 | 5/2020 | Garlepp et al. |
| 2020/0210666 A1 | 7/2020 | Flament |
| 2020/0302140 A1 | 9/2020 | Lu et al. |

FOREIGN PATENT DOCUMENTS

| | | |
|---|---|---|
| CN | 105264542 A | 1/2016 |
| EP | 1214909 A1 | 6/2002 |
| EP | 2884301 A1 | 6/2015 |
| EP | 3086261 A2 | 10/2016 |
| JP | 2011040467 A | 2/2011 |
| WO | 2009096576 A2 | 8/2009 |
| WO | 2009137106 A2 | 11/2009 |
| WO | 2014035564 A1 | 3/2014 |
| WO | 2015009635 A1 | 1/2015 |
| WO | 2015112453 A1 | 7/2015 |
| WO | 2015120132 A1 | 8/2015 |
| WO | 2015131083 A1 | 9/2015 |
| WO | 2015134816 A1 | 9/2015 |
| WO | 2015183945 A1 | 12/2015 |
| WO | 2016007250 A1 | 1/2016 |
| WO | 2016011172 A1 | 1/2016 |
| WO | 2016040333 A2 | 3/2016 |
| WO | 2016061406 A1 | 4/2016 |
| WO | 2016061410 A1 | 4/2016 |
| WO | 2017003848 A1 | 1/2017 |
| WO | 2017053877 A2 | 3/2017 |
| WO | 2017192895 A1 | 11/2017 |
| WO | 2017196678 A1 | 11/2017 |
| WO | 2017196682 A1 | 11/2017 |
| WO | 2017192903 A3 | 12/2017 |

OTHER PUBLICATIONS

ISA/EP, Partial International Search Report for International Application No. PCT/US2019/034032, 8 pages, dated Sep. 12, 2019, 8.

ISA/EP, International Search Report and Written Opinion for International Application # PCT/US2018/063431, pp. 1-15, dated Feb. 5, 2019.

ISA/EP, International Search Report and Written Opinion for International Application # PCT/US2019/015020, pp. 1-23, dated Jul. 1, 2019.

ISA/EP, International Search Report and Written Opinion for International Application # PCT/US2019/023440, pp. 1-10, dated Jun. 4, 2019.

ISA/EP, International Search Report and Written Opinion for International Application No. PCT/US2017/031120, 12 pages, dated Aug. 29, 2017.

ISA/EP, International Search Report and Written Opinion for International Application No. PCT/US2017/031127, 13 pages, dated Sep. 1, 2017.

ISA/EP, International Search Report and Written Opinion for International Application No. PCT/US2017/031134, 12 pages, dated Aug. 30, 2017.

ISA/EP, International Search Report and Written Opinion for International Application No. PCT/US2017/031140, 18 pages, dated Nov. 2, 2017.

(56) References Cited

OTHER PUBLICATIONS

ISA/EP, International Search Report and Written Opinion for International Application No. PCT/US2017/031421 13 pages, dated Jun. 21, 2017.
ISA/EP, International Search Report and Written Opinion for International Application No. PCT/US2017/031426 13 pages, dated Jun. 22, 2017.
ISA/EP, International Search Report and Written Opinion for International Application No. PCT/US2017/031431, 14 pages, dated Aug. 1, 2017.
ISA/EP, International Search Report and Written Opinion for International Application No. PCT/US2017/031434, 13 pages, dated Jun. 26, 2017.
ISA/EP, International Search Report and Written Opinion for International Application No. PCT/US2017/031439, 10 pages, dated Jun. 20, 2017.
ISA/EP, International Search Report and Written Opinion for International Application No. PCT/US2017/031824, 18 pages, dated Sep. 22, 2017.
ISA/EP, International Search Report and Written Opinion for International Application No. PCT/US2017/031827, 16 pages, dated Aug. 1, 2017.
ISA/EP, International Search Report and Written Opinion for International Application No. PCT/US2017/031831, 12 pages, dated Jul. 21, 2017.
ISA/EP, International Search Report and Written Opinion for International Application No. PCT/US2018/037364, 10 pages, dated Sep. 3, 2018.
ISA/EP, International Search Report for International Application No. PCT/US2017/031826, 16 pages, dated Feb. 27, 2018.
ISA/EP, Partial International Search Report for International Application No. PCT/US2017/031140, 13 pages, dated Aug. 29, 2017.
ISA/EP, Partial International Search Report for International Application No. PCT/US2017/031826, 12 pages, dated Nov. 30, 2017.
"Moving Average Filters", Waybackmachine XP05547422, Retrieved from the Internet: URL:https://web.archive.org/web/20170809081353/https//www.analog.com/media/en/technical-documentation/dsp-book/dsp_book_Ch15.pdf [retrieved on Jan. 24, 2019], Aug. 9, 2017, 1-8.
Office Action for CN App No. 201780029016.7 dated Mar. 24, 2020, 7 pages.
"Receiver Thermal Noise Threshold", Fisher Telecommunication Services, Satellite Communications. Retrieved from the Internet URL:https://web.archive.org/web/20171027075705/http//www.fishercom.xyz:80/satellite-communications/receiver-thermal-noise-threshold.html, Oct. 27, 2017, 3.
"Sleep Mode", Wikipedia, Retrieved from the Internet: URL:https://web.archive.org/web/20170908153323/https://en.wikipedia.org/wiki/Sleep_mode [retrieved on Jan. 25, 2019], Sep. 8, 2017, 1-3.
"TMS320C5515 Fingerprint Development Kit (FDK) Hardware Guide", Texas Instruments, Literature No. SPRUFX3, XP055547651, Apr. 2010, 1-26.
"ZTE V7 Max. 5,5" smartphone on MediaTeck Helio P10 cpu; Published on Apr. 20, 2016; https://www.youtube.com/watch?v=ncNCbpkGQzU (Year: 2016).
Cappelli, et al., "Fingerprint Image Reconstruction from Standard Templates", IEEE Transactions on Pattern Analysis and Machine Intelligence, IEEE Computer Society, vol. 29, No. 9, Sep. 2007, 1489-1503.
Dausch, et al., "Theory and Operation of 2-D Array Piezoelectric Micromachined Ultrasound Transducers", IEEE Transactions on Ultrasonics, and Frequency Control, vol. 55, No. 11;, Nov. 2008, 2484-2492.
Feng, et al., "Fingerprint Reconstruction: From Minutiae to Phase", IEEE Transactions on Pattern Analysis and Machine Intelligence, IEEE Computer Society, vol. 33, No. 2, Feb. 2011, 209-223.
Hopcroft, et al., "Temperature Compensation of a MEMS Resonator Using Quality Factor as a Thermometer", Retrieved from Internet: http://micromachine.stanford.edu/~amanu/linked/MAH_MEMS2006.pdf, 2006, 222-225.
Hopcroft, et al., "Using the temperature dependence of resonator quality factor as a thermometer", Applied Physics Letters 91. Retrieved from Internet: http://micromachine.stanford.edu/~hopcroft/Publications/Hopcroft_QT_ApplPhysLett_91_013505.pdf, 2007, 013505-1-031505-3.
Jiang, et al., "Ultrasonic Fingerprint Sensor with Transmit Beamforming Based on a PMUT Array Bonded to CMOS Circuitry", IEEE Transactions on Ultrasonics Ferroelectrics and Frequency Control, Jan. 1, 2017, 1-9.
Kumar, et al., "Towards Contactless, Low-Cost and Accurate 3D Fingerprint Identification", IEEE Transactions on Pattern Analysis and Machine Intelligence, IEEE Computer Society, vol. 37, No. 3, Mar. 2015, 681-696.
Lee, et al., "Low jitter and temperature stable MEMS oscillators", Frequency Conlrol Symposium (FCS), 2012 IEEE International, May 2012, 1-5.
Li, et al., "Capacitive micromachined ultrasonic transducer for ultra-low pressure measurement: Theoretical study", AIP Advances 5.12. Retrieved from Internet: http://scitation.aip.org/content/aip/journal/adva/5/12/10.1063/1.4939217, 2015, 127231.
Pang, et al., "Extracting Valley-Ridge Lines from Point-Cloud-Based 3D Fingerprint Models", IEEE Computer Graphics and Applications, IEEE Service Center, New York, vol. 33, No. 4, Jul./Aug. 2013, 73-81.
Papageorgiou, et al., "Self-Calibration of Ultrasonic Transducers in an Intelligent Data Acquisition System", International Scientific Journal of Computing, 2003, vol. 2, Issue 2 Retrieved Online: URL: https://scholar.google.com/scholar?q=self-calibration+of+ultrasonic+transducers+in+an+intelligent+data+acquisition+system&hl=en&as_sdt=0&as_vis=1&oi=scholart, 2003, 9-15.
Qiu, et al., "Piezoelectric Micromachined Ultrasound Transducer (PMUT) Arrays for Integrated Sensing, Actuation and Imaging", Sensors 15, doi:10.3390/s150408020, Apr. 3, 2015, 8020-8041.
Ross, et al., "From Template to Image: Reconstructing Fingerprints from Minutiae Points", IEEE Transactions on Pattern Analysis and Machine Intelligence, IEEE Computer Society, vol. 29, No. 4, Apr. 2007, 544-560.
Rozen, et al., "Air-Coupled Aluminum Nitride Piezoelectric Micromachined Ultrasonic Transducers at 0.3 MHZ to 0.9 MHZ", 2015 28th IEEE International Conference on Micro Electro Mechanical Systems (MEMS), IEEE, Jan. 18, 2015, 921-924.
Savoia, et al., "Design and Fabrication of a cMUT Probe for Ultrasound Imaging of Fingerprints", 2010 IEEE International Ultrasonics Symposium Proceedings, Oct. 2010, 1877-1880.
Shen, et al., "Anisotropic Complementary Acoustic Metamaterial for Canceling out Aberrating Layers", American Physical Society, Physical Review X 4.4: 041033., Nov. 19, 2014, 041033-1-041033-7.
Thakar, et al., "Multi-resonator approach to eliminating the temperature dependence of silicon-based timing references", Hilton Head'14. Retrieved from the Internet: http://blog.narotama.ac.id/wp-content/uploads/2014/12/Multi-resonator-approach-to-eliminating-the-temperature-dependance-of-silicon-based-timing-references.pdf, 2014, 415-418.
Zhou, et al., "Partial Fingerprint Reconstruction with Improved Smooth Extension", Network and System Security, Springer Berlin Heidelberg, Jun. 3, 2013, 756-762.
ISA/EP, International Search Report and Written Opinion for International Application No. PCT/US2020/033854, 16 pages, dated Nov. 3, 2020.
ISA/EP, International Search Report and Written Opinion for International Application No. PCT/US2020/039208, 10 pages, dated Oct. 9, 2020.
ISA/EP, International Search Report and Written Opinion for International Application No. PCT/US2020/039452, 11 pages, dated Sep. 9, 2020.
ISA/EP, Partial Search Report for International Application No. PCT/US2020/033854, 10 pages, dated Sep. 8, 2020.
Office Action for CN App No. 201780029016.7 dated Sep. 25, 2020, 7 pages.
Tang, et al., "11.2 3D Ultrasonic Fingerprint Sensor-on-a-Chip", 2016 IEEE International Solid-State Circuits Conference, IEEE, Jan. 31, 2016, 202-203.

(56) References Cited

OTHER PUBLICATIONS

EP Office Action, for Application 17724184.1, dated Oct. 12, 2021, 6 pages.
EP Office Action, dated Oct. 9, 2021, 6 pages.
European Patent Office, Office Action, App 17725018, pp. 5, dated Oct. 25, 2021.
Tang, et al., "Pulse-echo ultrasonic fingerprint sensor on a chip", 2015 Transducers, 2015 18th International Conference on Solid-State Sensors, Actuators and Microsystems, Apr. 1, 2015, 674-677.

* cited by examiner

FAKE FINGER DETECTION BASED ON TRANSIENT FEATURES

RELATED APPLICATIONS

This application claims priority to and the benefit of U.S. Patent Provisional Patent Application 62/866,510, filed on Jun. 25, 2019, entitled "FAKE FINGER INVESTIGATION USING TRANSIENT FEATURES," by Akhbari et al., and assigned to the assignee of the present application, which is incorporated herein by reference in its entirety.

BACKGROUND

Fingerprint sensors have become ubiquitous in mobile devices as well as other devices (e.g., locks on cars and buildings) and applications for authenticating a user's identity. They provide a fast and convenient way for the user to unlock a device, provide authentication for payments, etc. It is essential that fingerprint sensors operate at a level of security that, at a minimum, reduces the potential for circumvention of security of fingerprint authentication. For instance, fake fingers having fake or spoofed fingerprints can be used to attempt to circumvent fingerprint authentication at fingerprint sensors.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DESCRIPTION OF EMBODIMENTS

Figure 1:
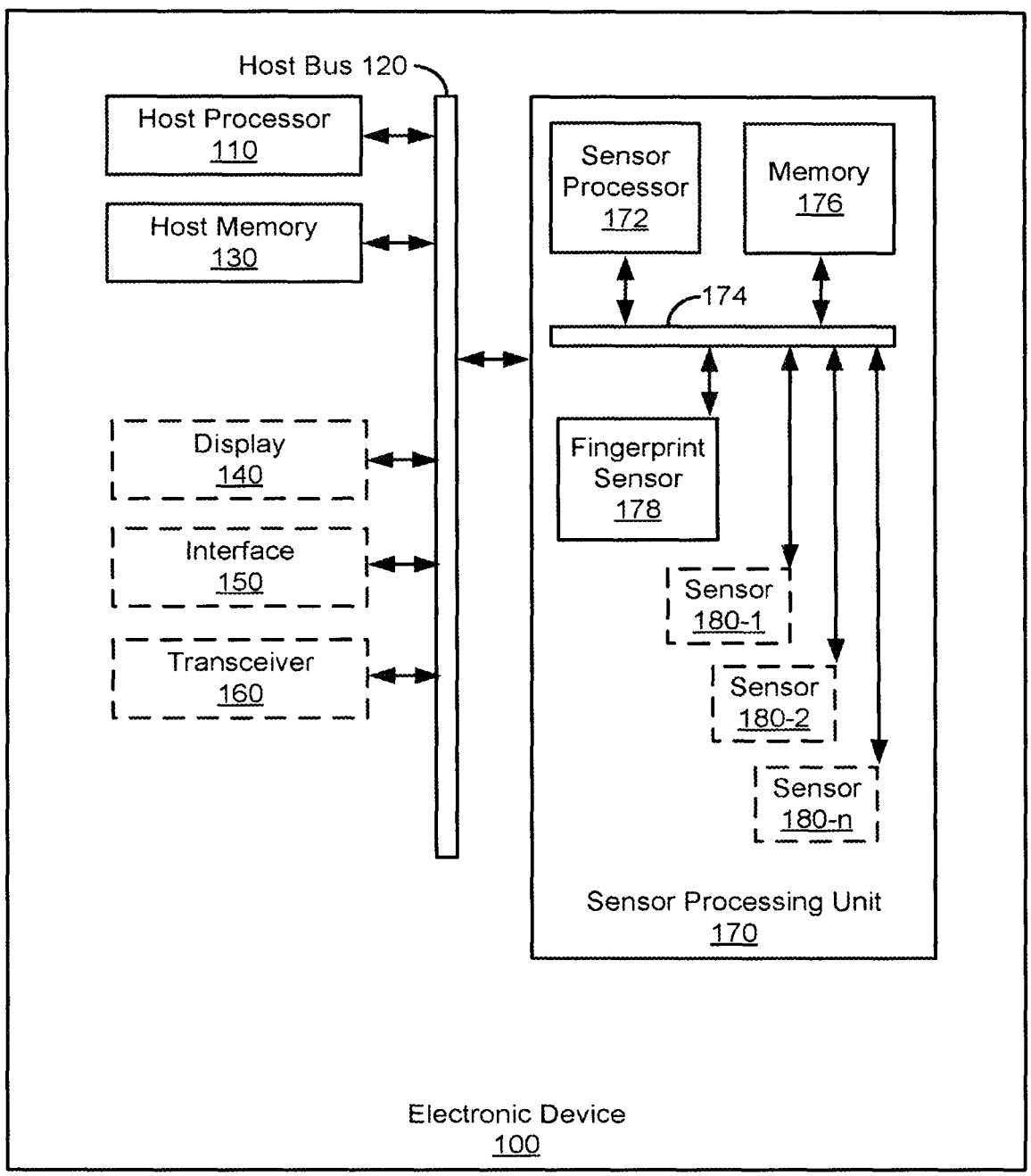
FIG. 1 is a block diagram of an example electronic device 100 upon which embodiments described herein may be implemented.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "capturing," "extracting," "applying," "determining," "performing," "providing," "receiving," "analyzing," "confirming," "displaying," "presenting," "using," "completing," "instructing," "comparing," "executing," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of a device including a fingerprint sensor, upon which described embodiments can be implemented. An example fingerprint sensor and system for determining whether a fingerprint image is generated using a real finger or a fake finger is then described, in accordance with various embodiments. Example operations of a fingerprint sensor for determining whether a fingerprint image is generated using a real finger or a fake finger using transient features are then described.

Fingerprint sensors are used in electronic devices for user authentication, such as mobile electronic devices and applications operating on mobile electronic devices, locks for accessing cars or buildings, for protecting against unauthorized access to the devices and/or applications. Authentication of a fingerprint at a fingerprint sensor is performed before providing access to a device and/or application. In order to circumvent fingerprint authentication, attempts can be made to copy or spoof fingerprints of an authorized user using a fake or artificial finger. As such, fingerprint sensors should be capable of distinguishing real fingers from fake, artificial, or even dead fingers, also referred to herein as performing "spoof detection" or "fake finger detection". A "spoofed" fingerprint is a fake or artificial fingerprint that is used to attempt to circumvent security measures requiring fingerprint authentication. For example, an artificial finger may be used to gain unauthorized access to the electronic device or application, by making an unauthorized copy of the fingerprint of an authorized user, e.g., "spoofing" an actual fingerprint. The spoof detection may be performed by analyzing fingerprint images captured by the fingerprint sensor, e.g., performing biometric analysis of the fingerprint images, or looking at any characteristics that can help distinguish a fake/spoof fingerprint from a real fingerprint. These characteristics may be static features or dynamic features which have a certain time dependency because they change over time.

Embodiments described herein provide methods and systems for determining whether a finger interacting with a fingerprint sensor, for purposes of authentication, is a real finger or a fake finger based on dynamic features, also referred to herein as transient features. Transient features may refer to the characteristics of the signals or changes of the signal (e.g., a transient signal feature), or may refer to any dynamic characteristics of the fingerprint itself (e.g., a transient spatial feature). For example, a transient spatial feature may include how the fingerprint, or feature of the fingerprint, deform when pressed on the sensor surface or lifted from the sensor surface. Physiological transient features may also be used, such as the influence of transpiration on the measurements.

Embodiments described herein provide for determining whether a finger is a real finger at an ultrasonic fingerprint sensor. A sequence of images of a fingerprint of a finger are captured at an ultrasonic fingerprint sensor, wherein the sequence of images includes images captured during a change in contact state between the finger and the ultrasonic fingerprint sensor. In one embodiment, the sequence of images includes images of the finger separating or lifting from a contact surface of the ultrasonic fingerprint sensor. In one embodiment, the sequence of images includes images of the finger contacting or pressing on a contact surface of the ultrasonic fingerprint sensor. It should be appreciated that the sequence of images can include images of the finger contacting the contact surface of the ultrasonic fingerprint sensor and separating from the contact surface of the ultrasonic fingerprint sensor.

A plurality of transient features of the finger is extracted from the sequence of images. In some embodiments, extracting the plurality of transient features of the finger from the sequence of images includes extracting the plurality of transient features of the finger from the sequence of images at pixels of the sequence of images that satisfy a certain criteria, e.g., a signal change criteria. In one embodiment, the pixels of the sequence of images exhibiting signal changes relative to other pixels exceeding a change threshold include pixels at ridges of the fingerprint. In other embodiments, extracting the plurality of transient features of the finger from the sequence of images includes extracting the plurality of transient features of the finger from the sequence of images at pixels corresponding to a ridge of the fingerprint.

In some embodiments, the plurality of transient features includes at least one transient signal feature. In some embodiments, the plurality of transient features includes at least one transient spatial feature. In some embodiments, the at least one transient spatial feature includes a transient fingerprint pattern feature. In some embodiments, the at least one transient spatial feature includes a transient contact pattern feature. In some embodiments, at least one transient feature of the plurality of transient features is related to a deformation of the finger, the fingerprint pattern, or the ridge/valley pattern or profile.

A classifier is applied to the plurality of transient features to classify the finger as one of a real finger and a fake finger. In some embodiments, one or more transient features of the plurality of transient features are used as a feature vector of the classifier. In some embodiments, the classifier is constrained to considering the finger for an enrolled user. It is determined whether the finger is a real finger based on an output of the classifier. In some embodiments, the output of the classifier includes a probability whether the finger is a real finger or a fake finger.

EXAMPLE MOBILE ELECTRONIC DEVICE

Turning now to the figures, FIG. 1 is a block diagram of an example electronic device 100. As will be appreciated, electronic device 100 may be implemented as a device or apparatus, such as a handheld mobile electronic device. For example, such a mobile electronic device may be, without limitation, a mobile telephone phone (e.g., smartphone, cellular phone, a cordless phone running on a local network, or any other cordless telephone handset), a wired telephone (e.g., a phone attached by a wire), a personal digital assistant (PDA), a video game player, video game controller, a Head Mounted Display (HMD), a virtual or augmented reality device, a navigation device, an activity or fitness tracker device (e.g., bracelet, clip, band, or pendant), a smart watch or other wearable device, a mobile internet device (MID), a personal navigation device (PND), a digital still camera, a digital video camera, a portable music player, a portable video player, a portable multi-media player, a remote control, or a combination of one or more of these devices. In other embodiments, electronic device 100 may be implemented as a fixed electronic device, such as and without limitation, an electronic lock, a doorknob, a car start button, an automated teller machine (ATM), etc. In accordance with various embodiments, electronic device 100 is capable of reading fingerprints.

As depicted in FIG. 1, electronic device 100 may include a host processor 110, a host bus 120, a host memory 130, and a sensor processing unit 170. Some embodiments of electronic device 100 may further include one or more of a display device 140, an interface 150, a transceiver 160 (all depicted in dashed lines) and/or other components. In various embodiments, electrical power for electronic device 100 is provided by a mobile power source such as a battery (not shown), when not being actively charged.

Host processor 110 can be one or more microprocessors, central processing units (CPUs), DSPs, general purpose microprocessors, ASICs, ASIPs, FPGAs or other processors which run software programs or applications, which may be stored in host memory 130, associated with the functions and capabilities of electronic device 100.

Host bus 120 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. In the embodiment shown, host processor 110, host memory 130, display 140, interface 150, transceiver 160, sensor processing unit (SPU) 170, and other components of electronic device 100 may be coupled communicatively through host bus 120 in order to exchange commands and data. Depending on the architecture, different bus configurations may be employed as desired. For example, additional buses may be used to couple the various components of electronic device 100, such as by using a dedicated bus between host processor 110 and memory 130.

Host memory 130 can be any suitable type of memory, including but not limited to electronic memory (e.g., read only memory (ROM), random access memory, or other electronic memory), hard disk, optical disk, or some combination thereof. Multiple layers of software can be stored in host memory 130 for use with/operation upon host processor 110. For example, an operating system layer can be provided for electronic device 100 to control and manage system resources in real time, enable functions of application software and other layers, and interface application programs with other software and functions of electronic device 100. Similarly, a user experience system layer may operate upon or be facilitated by the operating system. The user experience system may comprise one or more software application programs such as menu navigation software, games, device function control, gesture recognition, image processing or adjusting, voice recognition, navigation software, communications software (such as telephony or wireless local area network (WLAN) software), and/or any of a wide variety of other software and functional interfaces for interaction with the user can be provided. In some embodiments, multiple different applications can be provided on a single electronic device 100, and in some of those embodiments, multiple applications can run simultaneously as part of the user experience system. In some embodiments, the user experience system, operating system, and/or the host processor 110 may operate in a low-power mode (e.g., a sleep mode) where very few instructions are processed. Such a low-power mode may utilize only a small fraction of the processing power of a full-power mode (e.g., an awake mode) of the host processor 110.

Display 140, when included, may be a liquid crystal device, (organic) light emitting diode device, or other display device suitable for creating and visibly depicting graphic images and/or alphanumeric characters recognizable to a user. Display 140 may be configured to output images viewable by the user and may additionally or alternatively function as a viewfinder for camera. It should be appreciated that display 140 is optional, as various electronic devices, such as electronic locks, doorknobs, car start buttons, etc., may not require a display device.

Interface 150, when included, can be any of a variety of different devices providing input and/or output to a user, such as audio speakers, touch screen, real or virtual buttons, joystick, slider, knob, printer, scanner, computer network I/O device, other connected peripherals and the like.

Transceiver 160, when included, may be one or more of a wired or wireless transceiver which facilitates receipt of data at electronic device 100 from an external transmission source and transmission of data from electronic device 100 to an external recipient. By way of example, and not of limitation, in various embodiments, transceiver 160 comprises one or more of: a cellular transceiver, a wireless local area network transceiver (e.g., a transceiver compliant with one or more Institute of Electrical and Electronics Engineers (IEEE) 802.11 specifications for wireless local area network communication), a wireless personal area network transceiver (e.g., a transceiver compliant with one or more IEEE 802.15 specifications for wireless personal area network communication), and a wired a serial transceiver (e.g., a universal serial bus for wired communication).

Electronic device 100 also includes a general purpose sensor assembly in the form of integrated Sensor Processing Unit (SPU) 170 which includes sensor processor 172, memory 176, a fingerprint sensor 178, and a bus 174 for facilitating communication between these and other components of SPU 170. In some embodiments, SPU 170 may include at least one additional sensor 180 (shown as sensor 180-1, 180-2, . . . 180-$n$) communicatively coupled to bus 174. In some embodiments, at least one additional sensor 180 is a force or pressure sensor (e.g. a touch sensor) configured to determine a force or pressure or a temperature sensor configured to determine a temperature at electronic device 100. The force or pressure sensor may be disposed within, under, or adjacent fingerprint sensor 178. In some embodiments, all of the components illustrated in SPU 170 may be embodied on a single integrated circuit. It should be appreciated that SPU 170 may be manufactured as a stand-alone unit (e.g., an integrated circuit), that may exist separately from a larger electronic device and is coupled to host bus 120 through an interface (not shown). It should be appreciated that, in accordance with some embodiments, that SPU 170 can operate independent of host processor 110 and host memory 130 using sensor processor 172 and memory 176.

Sensor processor 172 can be one or more microprocessors, CPUs, DSPs, general purpose microprocessors, ASICs, ASIPs, FPGAs or other processors which run software programs, which may be stored in memory 176, associated with the functions of SPU 170. It should also be appreciated that fingerprint sensor 178 and additional sensor 180, when included, may also utilize processing and memory provided by other components of electronic device 100, e.g., host processor 110 and host memory 130.

Bus 174 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. In the embodiment shown, sensor processor 172, memory 176, fingerprint sensor 178, and other components of SPU 170 may be communicatively coupled through bus 174 in order to exchange data.

Memory 176 can be any suitable type of memory, including but not limited to electronic memory (e.g., read only memory (ROM), random access memory, or other electronic memory). Memory 176 may store algorithms or routines or other instructions for processing data received from fingerprint sensor 178 and/or one or more sensor 180, as well as the received data either in its raw form or after some processing. Such algorithms and routines may be implemented by sensor processor 172 and/or by logic or processing capabilities included in fingerprint sensor 178 and/or sensor 180.

A sensor 180 may comprise, without limitation: a temperature sensor, a humidity sensor, an atmospheric pressure sensor, an infrared sensor, a radio frequency sensor, a navigation satellite system sensor (such as a global positioning system receiver), an acoustic sensor (e.g., a microphone), an inertial or motion sensor (e.g., a gyroscope, accelerometer, or magnetometer) for measuring the orientation or motion of the sensor in space, or other type of sensor for measuring other physical or environmental factors. In one example, sensor 180-1 may comprise an acoustic sensor, sensor 180-2 may comprise a temperature sensor, and sensor 180-$n$ may comprise a motion sensor.

In some embodiments, fingerprint sensor 178 and/or one or more sensors 180 may be implemented using a micro-electromechanical system (MEMS) that is integrated with sensor processor 172 and one or more other components of SPU 170 in a single chip or package. It should be appreciated that fingerprint sensor 178 may be disposed behind display 140. Although depicted as being included within SPU 170, one, some, or all of fingerprint sensor 178 and/or one or more sensors 180 may be disposed externally to SPU 170 in various embodiments. It should be appreciated that fingerprint sensor 178 can be any type of fingerprint sensor, including without limitation, an ultrasonic sensor, an optical sensor, a camera, etc.

EXAMPLE FINGERPRINT SENSOR AND SYSTEM FOR DETERMINING WHETHER A FINGER IS A REAL FINGER OR A FAKE FINGER

Figure 2:
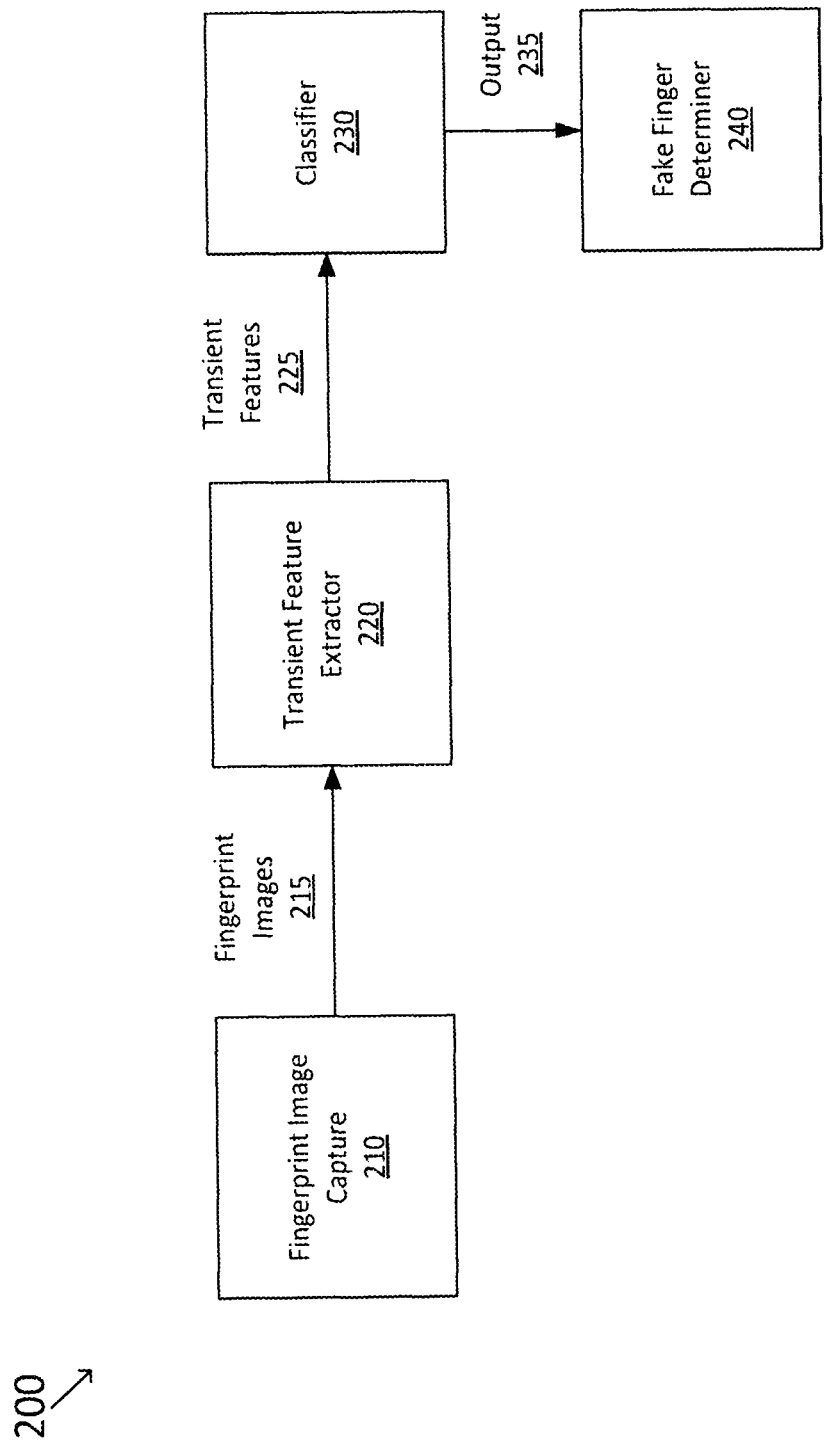
FIG. 2 illustrates a block diagram of an example fingerprint sensing system for determining whether a fingerprint image was generated using a real finger or a fake finger, according to some embodiments.

FIG. 2 illustrates a block diagram of an example fingerprint sensing system 200 for determining whether a fingerprint image was generated using a real finger or a fake finger, according to some embodiments. Fingerprint sensing system 200 is configured to determine whether a finger is a real finger or a fake finger using transient features extracted from fingerprint images captured during a change in contact state between the finger and the ultrasonic fingerprint sensor. It should be appreciated that fingerprint sensing system 200 can be implemented as hardware, software, or any combination thereof. It should also be appreciated that fingerprint image capture 210, transient feature extractor 220, classifier 230, and fake finger determiner 240 may be separate components, may be comprised within a single component, or may be comprised in various combinations of multiple components (e.g., classifier 230 and fake finger determiner 240 may be comprised within a single component), in accordance with some embodiments.

Fingerprint images 215 are captured at fingerprint image capture 210. It should be appreciated that, in accordance with various embodiments, fingerprint image capture 210 is an ultrasonic sensor (e.g., a sensor capable of transmitting and receiving ultrasonic signals). The fingerprint sensor is operable to emit and detect ultrasonic waves (also referred to as ultrasonic signals or ultrasound signals). An array of ultrasonic transducers (e.g., Piezoelectric Micromachined Ultrasonic Transducers (PMUTs)) may be used to transmit and receive the ultrasonic waves. The emitted ultrasonic waves are reflected from any objects in contact with (or in front of) the fingerprint sensor, and these reflected ultrasonic waves, or echoes, are then detected. Where the object is a finger, the waves are reflected from different features of the finger, such as the surface features on the skin, fingerprint, or features present in deeper layers of the finger (e.g., the dermis). Examples of surface features of a finger are ridges and valleys of a fingerprint. For example, the reflection of the sound waves from the ridge/valley pattern enables the fingerprint sensor to produce a fingerprint image that may be used for identification of the user.

Fingerprint image capture 210 is configured to capture a plurality of fingerprint images 215 in a sequence, where the sequence of images includes images captured during a change in contact state between the finger and the ultrasonic fingerprint sensor. A sequence of images is used to capture the transient nature of the signals, features, and characteristics of the fingerprint. In one embodiment, the sequence of images includes images of the finger contacting a contact surface of the ultrasonic fingerprint sensor, or changing a contact state. In one embodiment, the sequence of images includes images of the finger separating from a contact surface of the ultrasonic fingerprint sensor. It should be appreciated that the sequence of images can include images of the finger contacting the contact surface of the ultrasonic fingerprint sensor and separating from the contact surface of the ultrasonic fingerprint sensor. Capturing the sequence of images when the user presses a finger on the contact surface, or lifts a finger from the contact surface, enables the capturing of the sequence of images during a state of change. This change of state is related to the fact that a finger may deform and the contact between the fingerprint sensor and the finger changes. The characteristics of this changes are different for a real finger and a fake finger. The more the fake finger resembles a real finger, the smaller the difference in these characteristics. The transient features discussed in this disclosure enable a characterization of the state of change and are therefore used to differentiate between a real finger and a fake finger. Although, in the example embodiments discussed herein, a sequence of fingerprint images is used to derive the transient feature, it should be appreciated that other transient features may be derived directly from the received ultrasonic signals, without the forming of an image. Moreover, other types of transient features may be utilized in accordance with the described embodiments, such as temperature information (e.g., initial and steady state temperatures) detected by the ultrasonic fingerprint sensor or a temperature sensor of or related to the ultrasonic fingerprint sensor.

The capturing of the image sequence may be initiated whenever a change in signal is detected. For example, to capture the image sequence when the user presses the finger on the sensor, the image capture may be started as soon an object or finger starts interacting with the sensor. For an ultrasonic sensor with an array of ultrasonic transducers, a subset of transducers may be active in a low power mode, and as soon as a finger start interacting with the sensor, the full sensor may be activated to capture the sequence of images. In another example, where the user starts lifting the finger, a change in signal may occur as the pressure of the finger is reduced, and this may initiate the image sequence capture. The change of contact state may this be determined by the fingerprint sensor itself, or it may be detected by a second sensor associated with the fingerprint sensor. For example, a pressure sensor, a force sensor, or a touch sensor may be position near, below, or above the fingerprint sensor and this additional sensor may be used to detect a change in contact state that initiates the capturing of the image sequence.

The sequence of fingerprint images 215 can include any number of fingerprint images. In some embodiments, fingerprint images 215 are captured at periodic intervals (e.g., every 10 milliseconds) over a time period (e.g., 10 seconds). In some embodiments, the sequence of fingerprint images 215 includes at least three fingerprint images. In some embodiments, the fingerprint sensor may have a higher image capture rate when a change of contact state is detected, and a lower image capture rate during a steady state. For example, the sequence of fingerprint images 215 forwarded to transient feature extractor 220 may include two or more images captured during the change of contact state right after a finger is detected on the ultrasonic sensor, and a steady state image captured at a fixed amount of time after the finger is detected. In embodiments where the transient feature are deduced directly from the ultrasonic signals, the data transferred to the transient feature extractor 220 includes of a sequence of ultrasonic signal data.

Fingerprint images 215 are received at transient feature extractor 220, which is configured to extract transient features from the sequence of fingerprint images 215. Transient features may refer to the characteristics of the signals itself (e.g., a transient signal feature), or of any dynamic characteristics of the fingerprint itself (e.g., a transient spatial feature). For example, a transient spatial feature may include how the fingerprint, fingerprint pattern, or ridge profile deforms when the finger is pressed on the contact surface or lifted away from the contact surface. Physiological transient features may also be used, such as the influence of transpiration on the measurements.

Figure 3:
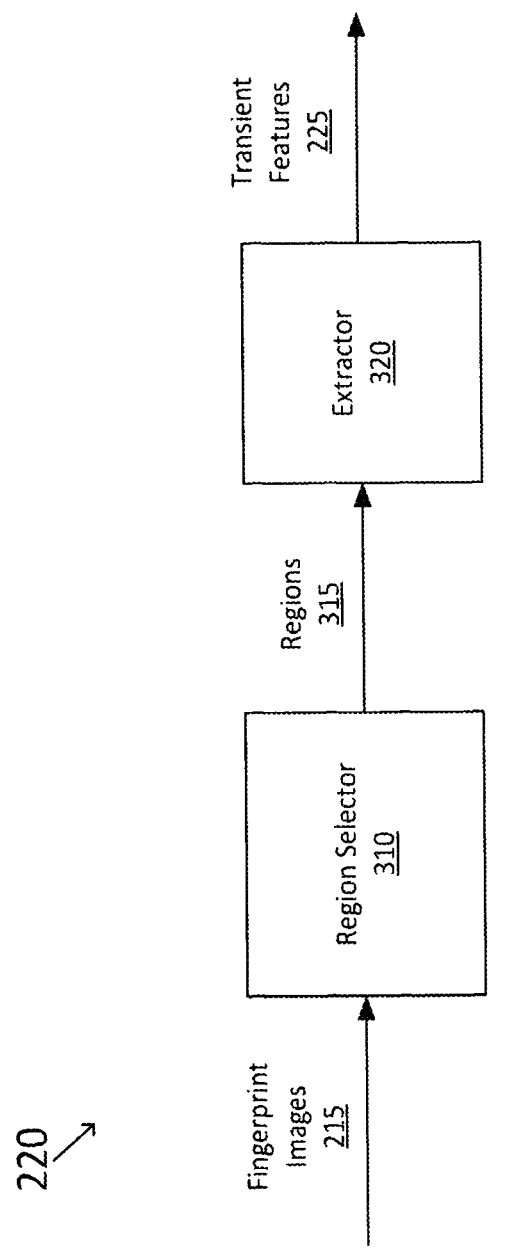
FIG. 3 illustrates a block diagram of a transient feature extractor, according to some embodiments.

FIG. 3 illustrates a block diagram of a transient feature extractor 220, according to some embodiments. In some embodiments, fingerprint images 215 are received at region selector 310, which is configured to select regions 315 of fingerprint images 215 for extracting transient features. It should be appreciated that regions 315 can include one or more pixels of fingerprint images 215. Region selector 310 allows for selection of a subset of pixels of fingerprint images 215, allowing for local pixel/region selection for transient feature extraction. It should be appreciated that region selector 310 is optional, and may not be used for global pixel selection of fingerprint images 215. For purposes of the instant specification, global pixel selection allows for the extraction of transient features of a large part of the pixels or all pixels of fingerprint images 215, and local pixel selection allows for the extraction of transient features of a subset of pixels of fingerprint images 215. In some embodiments, local pixel selection is performed for identifying pixels that exhibit a sufficient amount of signal change to be indicative of transient features (e.g., at ridges of the fingerprint, or involved in initial contact). It should be appreciated that the described embodiments can be performed using global or local pixel selection.

In some embodiment, region selector 310 identifies regions 315 of fingerprint images 215 that satisfy a signal change criteria. For example, a signal change criteria may be a signal change threshold value that, when exceeded, is satisfied. In some embodiments, pixels of the sequence of fingerprint images 215 exhibiting signal changes, e.g., relative to other pixels, exceeding a change threshold include pixels at ridges of the fingerprint. In other embodiments, region selector 310 identifies pixels corresponding to a ridge of the fingerprint.

Regions 315 (local pixel selection or global pixel selection) are received at extractor 320, which is operable to extract a plurality of transient features 225 from pixels of regions 315. In some embodiments, the plurality of transient features 225 includes at least one transient signal feature (e.g., a signal value). In some embodiments, the plurality of transient features 225 includes at least one transient spatial feature (e.g., a width of a fingerprint ridge). In some embodiments, the at least one transient spatial feature includes a transient fingerprint pattern feature, e.g., a flattening of ridges as the pressure of the contact is increased. Another example of transient spatial feature is ridge continuity referring to how broken up a ridge line is or how long the ridge segments are (more or less continuous, or broken up in many parts). In some embodiments, the at least one transient spatial feature includes a transient contact pattern feature, such as the part of the contact surface/image covered by a fingerprint pattern (e.g., starting at the first point of contact and then spreading over the image as the pressure increases, or vice-versa). In some embodiments, at least one transient feature of the plurality of transient features is related to a deformation of the finger due to the change in contact state. The deformation may be limited to the outer surface of the fingerprint, and may involve the deeper layers of the finger (or fingerprint), depending on the penetration depth of the ultrasound. In some embodiments, the transient feature used to determine if the finger is real is a combination of two or more of the above features. For example, comparison of the transient signal feature compare to the transient spatial features may be used as an indication if a finger is a real finger. In other words, does the change in the observed ultrasound signal correspond to the observed change of state based on the spatial feature such as the contact surface area and/or changes in ridges.

Figure 4A:
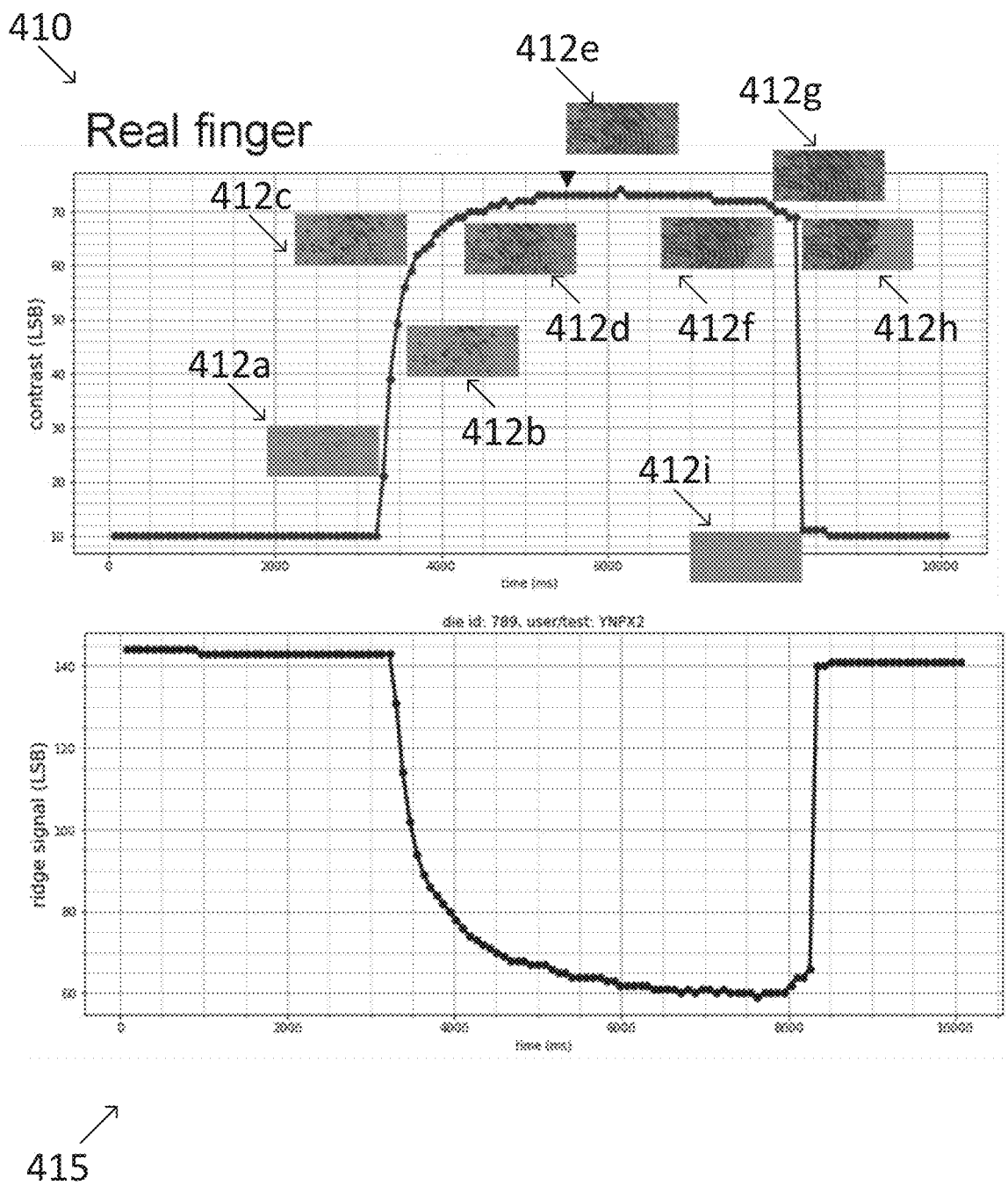
FIG. 4A illustrates example graphs of fingerprint image contrast over time and ridge signal strength over time during capture of a sequence of fingerprint images generated using a real finger, according to embodiments.

FIG. 4A illustrates example graph 410 of fingerprint image contrast over time and graph 415 of ridge signal strength over time during capture of a sequence of fingerprint images generated using a real finger, according to embodiments. The fingerprint images 412a through 412i illustrated in graph 410 shows the fingerprint images captured at the different time and are indicative of changes in contact state between the real finger and the ultrasonic sensor. As illustrated, fingerprint images 412a through 412d represent fingerprint images captured while the real finger is initially making contact with a contact surface of the ultrasonic fingerprint sensor, fingerprint images 412e and 412f represent fingerprint images captured during a substantially steady state of the real finger in contact with a contact surface of the ultrasonic fingerprint sensor, and fingerprint images 412g and 412i represent fingerprint images captured while the real finger is separating from the contact surface of the ultrasonic fingerprint sensor. Graph 415 illustrates the ridge signal strength that is substantially inverse to the contrast level of graph 410.

Figure 4B:
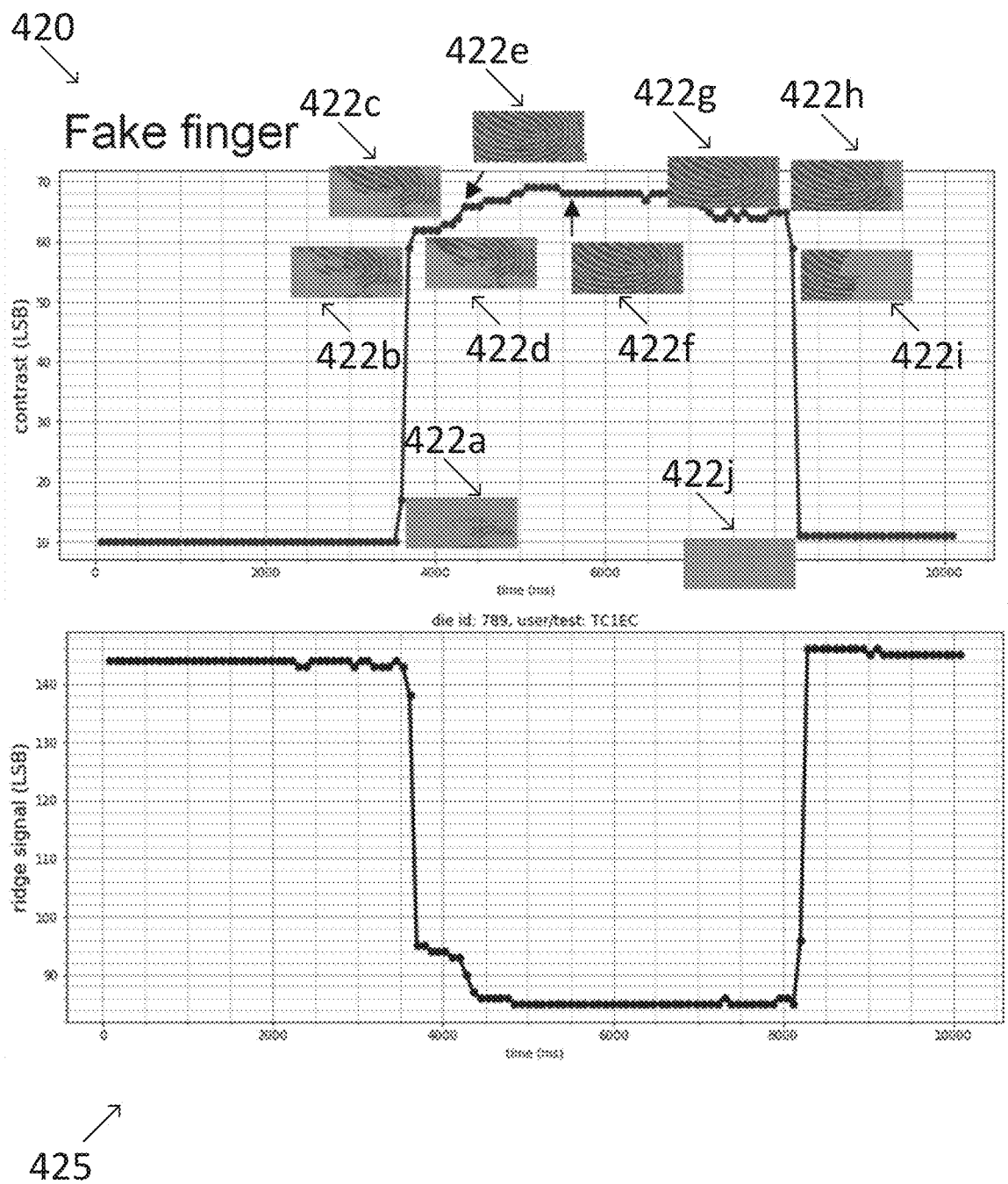
FIG. 4B illustrates example graphs of fingerprint image contrast over time and ridge signal strength over time during capture of a sequence of fingerprint images generated using a fake finger, according to embodiments.

FIG. 4B illustrates example graph 420 of fingerprint image contrast over time and graph 425 of ridge signal strength over time during capture of a sequence of fingerprint images generated using a fake finger, according to embodiments. The fingerprint images 422a through 422j illustrated in graph 420 are indicative of changes in contact state between the fake finger and the ultrasonic sensor. As illustrated, fingerprint images 422a through 422d represent fingerprint images captured while the fake finger is initially making contact with a contact surface of the ultrasonic fingerprint sensor, fingerprint images 422e through 422h represent fingerprint images captured during a substantially steady state of the fake finger in contact with a contact surface of the ultrasonic fingerprint sensor, and fingerprint images 422i and 422j represent fingerprint images captured while the fake finger is separating from the contact surface of the ultrasonic fingerprint sensor. Graph 425 illustrates the ridge signal strength that is substantially inverse to the contrast level of graph 420.

As illustrated, graph 415 illustrates that transient features of a real finger illustrate a gradual change in the slope of the ridge signal strength over time relative to the transient features of a fake finger, as shown in graph 425. This is particularly apparent while the finger is making contact with the ultrasonic fingerprint sensor, but is also apparent while the finger is separating from the ultrasonic sensor. By analyzing the transient features extracted from fingerprint images captured during a change in contact state between the finger and the ultrasonic fingerprint sensor. The transient signal features can be extracted from the signal intensities, contrasts etc., as discussed in more detail below. The fingerprint images 412a through 412i of graph 415 also show the change in spatial features that can be used to derive transient spatial features (e.g., area of image showing fingerprint pattern, continuity of ridges, width of ridges). In some embodiments, the transient features are extracted and classification is applied to classify the finger as a real finger or a fake finger.

Figure 5:
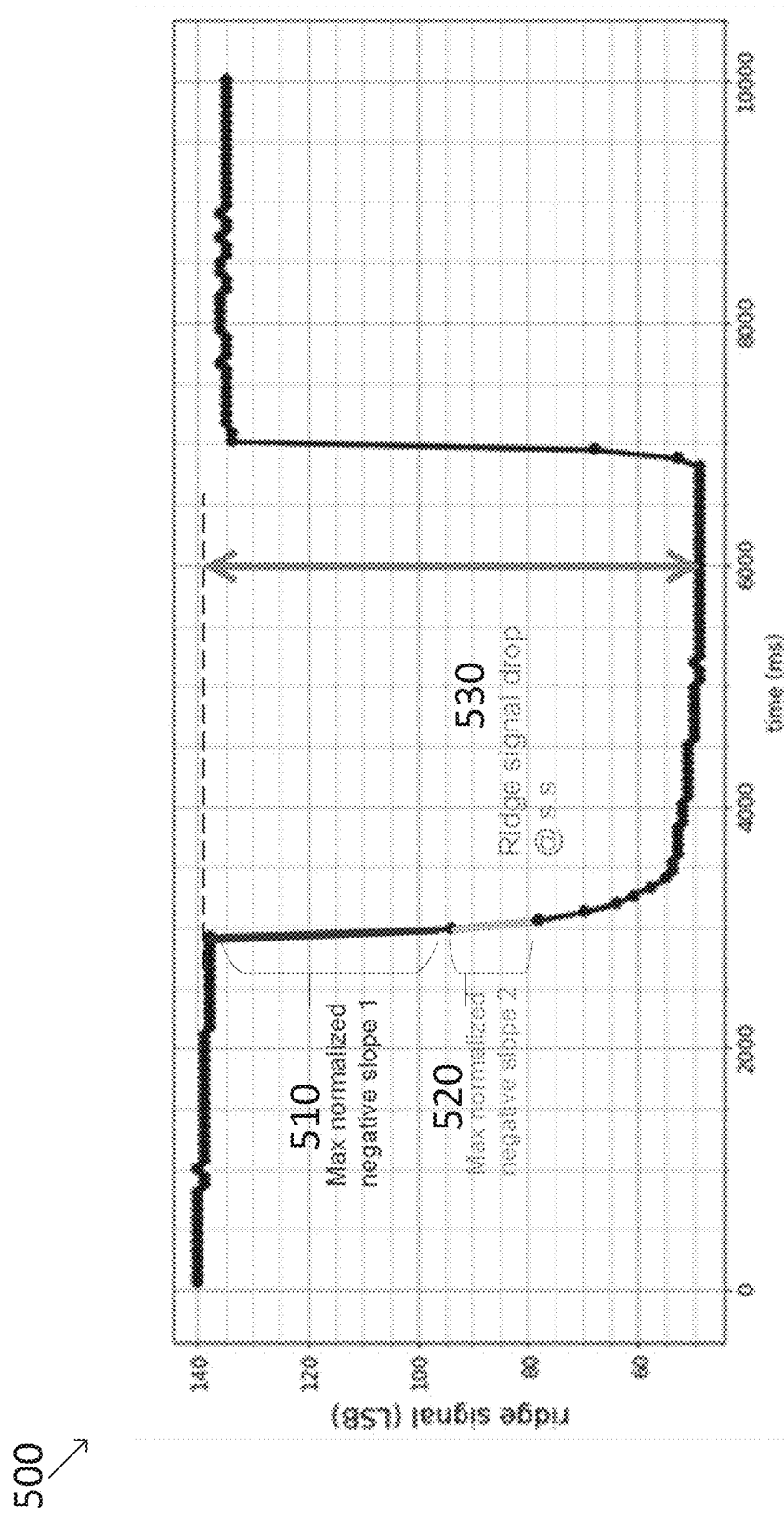
FIG. 5 illustrates an example graph of ridge signal strength over time during capture of a sequence of fingerprint images, according to embodiments.

FIG. 5 illustrates an example graph 500 of ridge signal strength over time during capture of a sequence of fingerprint images, according to embodiments. When the ridges of the fingerprint make contact with the sensor, ultrasonic waves are coupled into the finger and as a consequence, less ultrasonic waves are reflected back to the transducer. This results in a signal drop at the location of ridges. This effect is much less pronounced at valleys because of the air gap between the sensor and the fingerprint at the location of the valleys, resulting in a higher acoustic mismatch and this more reflection. Graph 500 illustrates two example transient features used for classifying a finger as a real finger or a fake finger, the ridge signal drop at steady state and a slope of the signal as the finger is making contact with the ultrasonic fingerprint sensor. Normalized negative slope 510 and normalized negative slope 520 illustrate slopes of the ridge signal at different stages as the finger is making contact with the ultrasonic fingerprint sensor. In this example, the slope of the signal change is determined at two instances, and a difference or ratio between the slopes may be used as a transient signal feature. In other example, other characteristics of the change in signal or rate of change in signal may be used. Ridge signal drop 530 illustrates that ridge signal drop to a steady state of the finger in contact with the ultrasonic sensor. In general, fake fingers have smaller ridge signal drop at steady state than real fingers, and have a fast response (e.g., a faster slope rate change) as the finger is making contact with the ultrasonic fingerprint sensor (as will be discussed below in relation to FIG. 7).

Figure 6:
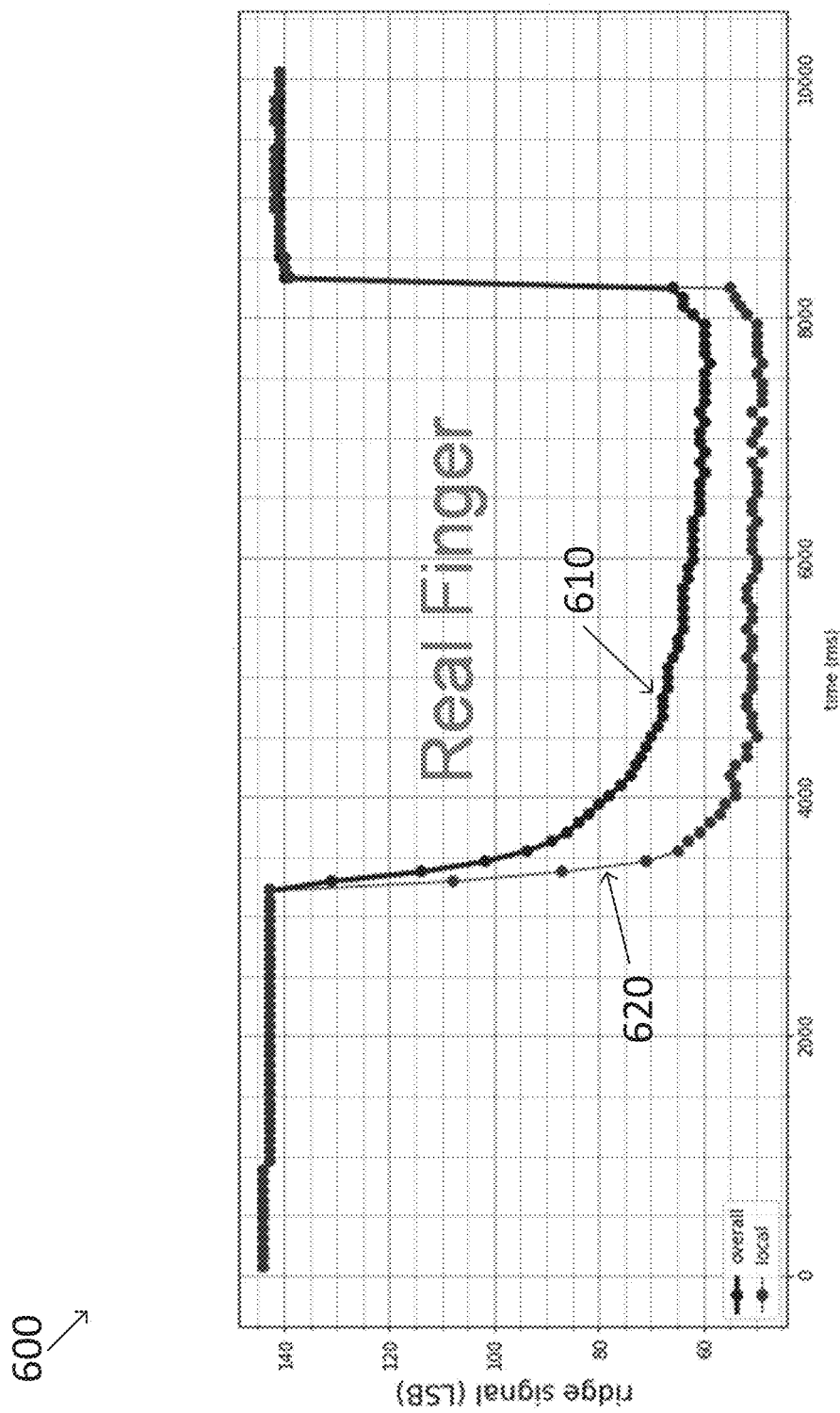
FIG. 6 illustrates an example graph of ridge signal strength over time during capture of a sequence of fingerprint images using a real finger, according to embodiments.

FIG. 6 illustrates an example graph 600 of ridge signal strength over time during capture of a sequence of fingerprint images using a real finger, according to embodiments. As described above, local pixel selection or global pixel selection can be used for transient feature extraction. Line 610 of graph 600 illustrates a plot of the global pixel selection and line 620 of graph 600 illustrates a plot of the local pixel selection. As discussed above, global pixel selection means that pixels over the whole image are taken in consideration, while local pixel selection means that a subset of the images is used. In one embodiment, global may mean considering all the pixels in the images, while local may mean using only the pixels corresponding to ridges. In another embodiment, local may indicate only those pixels are used involved with the initial contact or showing an initial change above a certain threshold. For a real finger, local pixel selection may provide a less steep slope than global pixel selection, and a reduced change in steady state signal drop.

Figure 7:
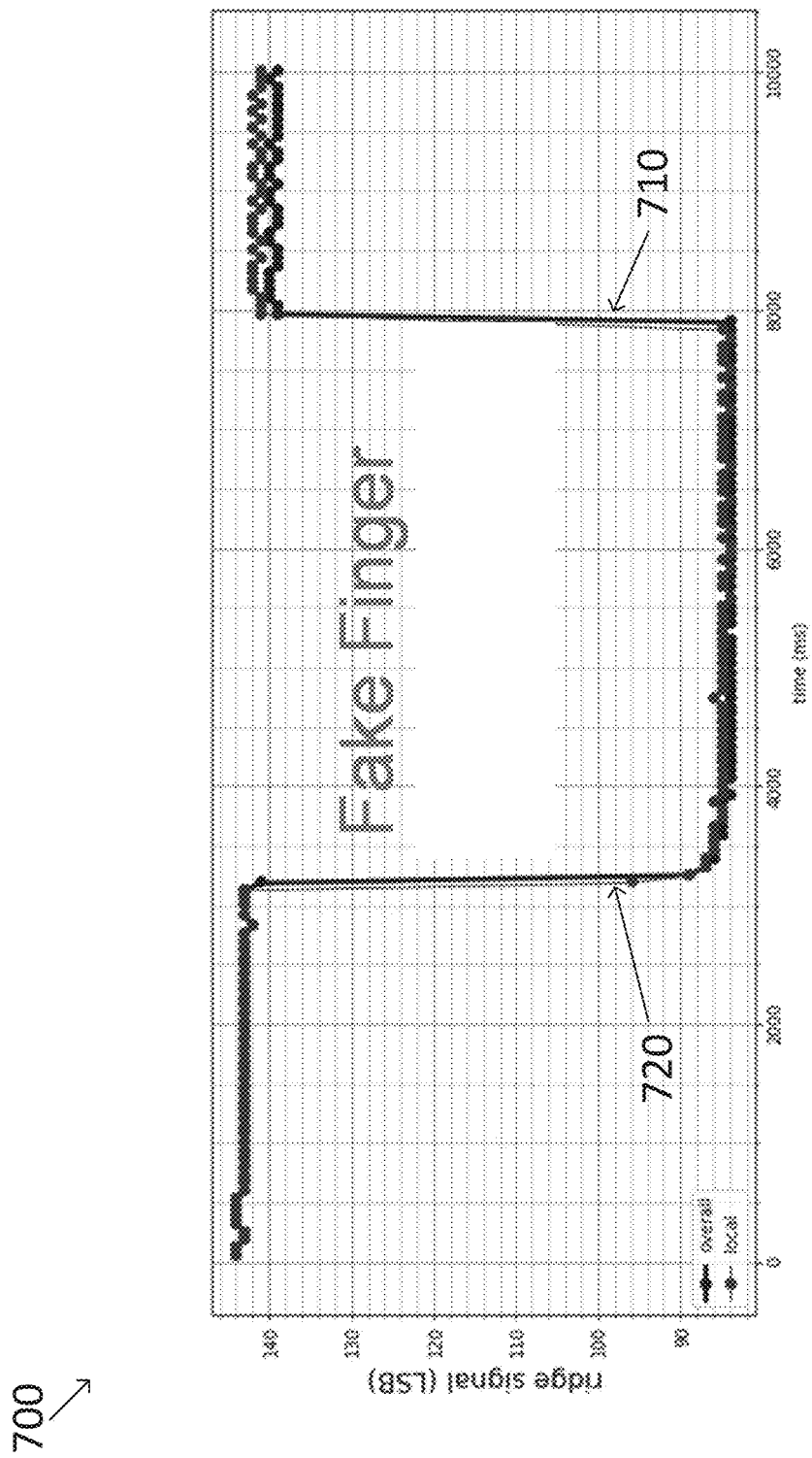
FIG. 7 illustrates an example graph of ridge signal strength over time during capture of a sequence of fingerprint images using a fake finger, according to embodiments.

FIG. 7 illustrates an example graph 700 of ridge signal strength over time during capture of a sequence of fingerprint images using a fake finger, according to embodiments. As described above, local pixel selection or global pixel selection can be used for transient feature extraction. Line 710 of graph 700 illustrates a plot of the global pixel selection and line 720 of graph 700 illustrates a plot of the local pixel selection. For a fake finger, the plots generated from local pixel selection and global pixel selection are much more alike, and may be difficult to distinguish. The comparison of the plots of local pixel selection to global pixel selection for ridge signal strength over time may also be used to distinguish between a real finger and a fake finger.

In one embodiment, the transient features are used as feature vectors in a classifier to determine if the finger is a real finger of a fake finger, but alternative methods to use the transient features to determine if the finger is a real finger may also be used. For example, the transient features (values) may be compared to reference (values), and if the transient features are within a threshold range of the reference, the finger is likely to be a real finger. Thereby, classifying the finger as a real finger or a fake finger based on the comparison. The probability of the finger being a real finger may be deduced from the difference between the transient feature (value) and the reference (value). Using a plurality of transient features may increase the confidence in the determination. The reference values may be predetermined, for example from measurement based on a plurality of users and or a plurality of (different types of) fake fingers. For increased performance, the reference values may be determined for authenticated user, for example during enrollment, and may also be context dependent. The contact dependent can help correct for external influences, such as e.g. temperature because at cold temperature the contact between the finger and sensor is less optimal, often due to dryness of the finger.

Figure 8:
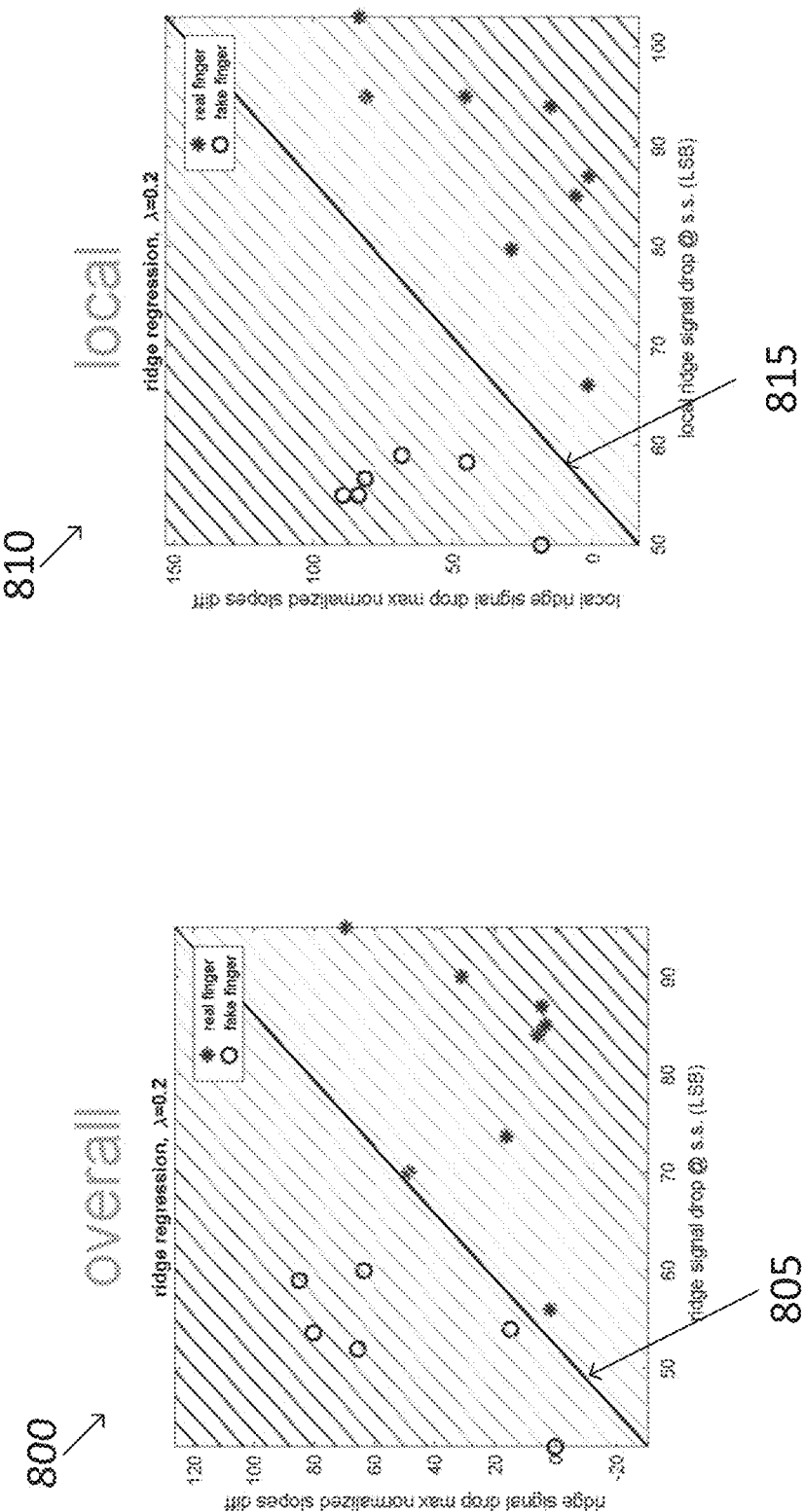
FIG. 8 illustrates example distributions of transient features as used by a classifier, according to some embodiments.

With reference again to FIG. 2, transient features 225 are received at classifier 230. Classifier 230 performs classification on transient features 225 to classify the finger as one of a real finger and a fake finger. In some embodiments, each transient feature of the plurality of transient features is a feature vector of the classifier 230. In some embodiments, the classifier is constrained to considering the finger for an enrolled user. This means that the decision of the difference classes is based on references determined for an authorized user, e.g., based on a user enrollment where the transient features for that user are measured and stored as a reference. Based on the transient features 225, classifier 230 generates output 235 as to whether the finger is a real finger or a fake finger. In one embodiment, output 235 of the classifier comprises a probability whether the finger is a real finger or a fake finger FIG. 8 illustrates example distributions of transient features as used by a classifier, according to some embodiments. Graph 800 illustrates the use of transient features to classify a plurality of real fingers from different users and a plurality of different fake fingers fabricated using various methods and materials. As can be seen in FIG. 8, the real fingers are located towards the bottom right while the fake fingers measurements are located more towards the top left of the figure. Graph 800 is based on transient features extracted from a global pixel selection and graph 810 illustrates similar observations using transient features extracted from a local pixel selection. The ridge signal drop to steady state and a difference in signal slope during the initial contact are used as transient features in the example, as discussed in relation to FIG. 5. This example shows a simple linear regression classifier to demonstrate how the transient features can be used to determine whether a finger is a real finger or a fake finger. Many other types of classifiers are known to the person skilled in the art, e.g., logistic regression classifiers, Gaussian Mixture Model classifiers, linear discriminant analysis (LDA) classifiers, neural network based classifiers, multiplayer perceptron classifiers, support vector machine classifier, etc., which can be used in a similar manner. The decision on which classifier to use may also depend on the transient features and/or the number of transient features to use. This example shows the use of two transient signal feature in a two-dimensional classifier. As discussed above, more transient features can be used in a multi-dimensional classifier using a plurality of transient signal feature and/or transient spatial feature.

As illustrated in graph 800, line 805 bisects graph 800 such that measured fingerprints plotted on the lower right of graph 800 are indicative of a real finger and measured fingerprints plotted on the upper left of graph 800 are indicative of a fake finger. Similarly, as illustrated in graph 810, line 815 bisects graph 800 such that measured fingerprints plotted on the lower right of graph 810 are indicative of a real finger and measured fingerprints plotted on the upper left of graph 810 are indicative of a fake finger. Lines 805 and 815 indicate a class boundary, and thus fingerprint measurements to the bottom right of the boundary are classified as a real finger and fingerprint measurements to the top left of the boundary are classified as a fake finger. The distance between the fingerprint measurements and the boundary can be used as a measure of the confidence in the classification, and this distance can be converted into a probability using any type of transfer function or activation function.

It is determined whether the finger is a real finger based on output 235 of the classifier at faker finger determiner 240. In some embodiments, the output 235 of the classifier includes a probability whether the finger is a real finger or a fake finger. In some embodiments, fake finger determiner 240 receives input from other types of spoof detection or fake finger detection, and makes the determination as to whether the finger is a fake finger based on multiple inputs, including output 235.

EXAMPLE OPERATIONS FOR OPERATING A FINGERPRINT SENSOR FOR DETERMINING WHETHER A FINGER IS A REAL FINGER OR A FAKE FINGER

Figure 9:
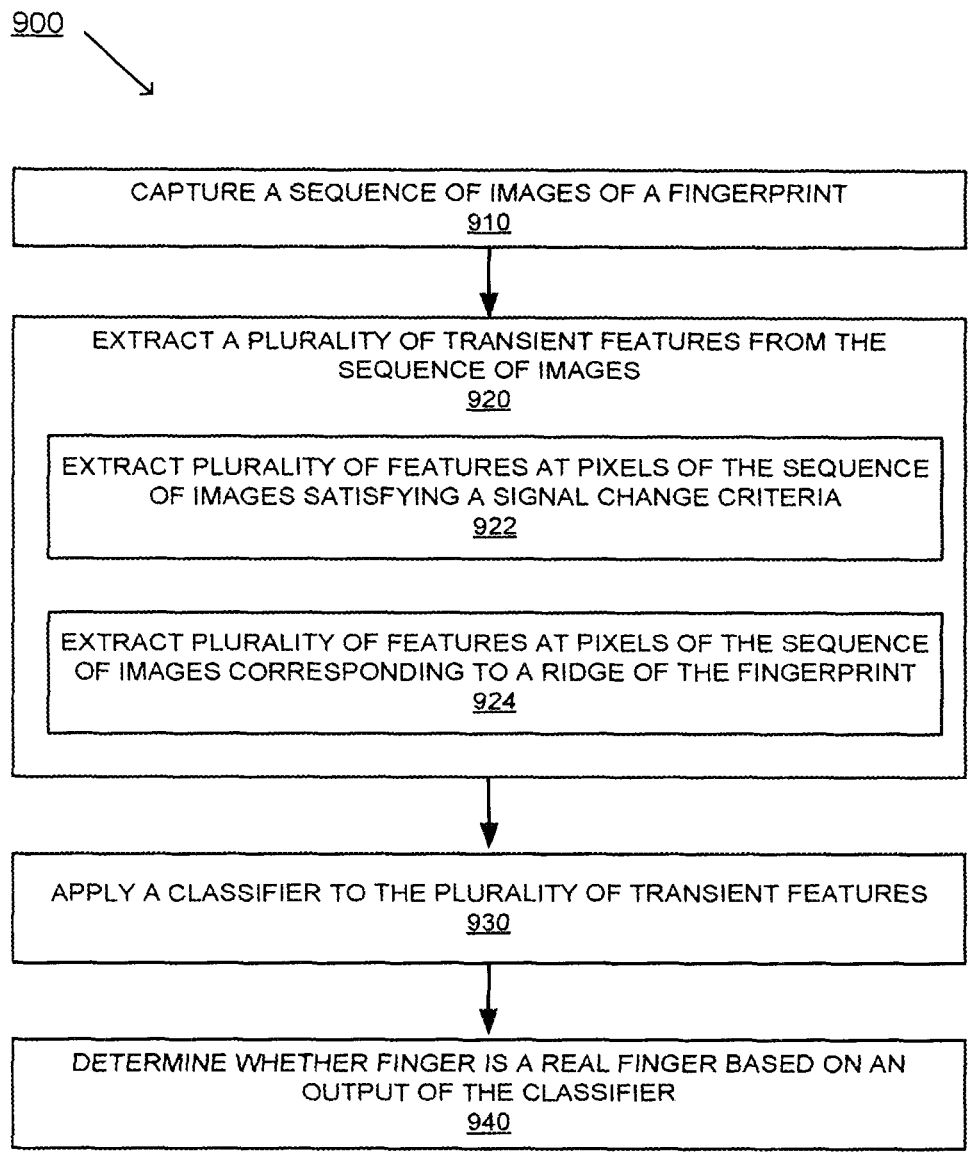
FIG. 9 illustrates an example process for determining whether a finger is a real finger at an ultrasonic fingerprint sensor, according to some embodiments.

FIG. 9 illustrates an example process 900 for determining whether a finger is a real finger at a fingerprint sensor, according to some embodiments. Procedures of process 900 will be described with reference to elements and/or components of various figures described herein. It is appreciated that in some embodiments, the procedures may be performed in a different order than described, that some of the described procedures may not be performed, and/or that one or more additional procedures to those described may be performed. The flow diagram includes some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

At procedure 910 of flow diagram 900, a sequence of images of a fingerprint of a finger are captured at an ultrasonic fingerprint sensor, wherein the sequence of images includes images captured during a change in contact state between the finger and the ultrasonic fingerprint sensor. In one embodiment, the sequence of images includes images of the finger separating from a contact surface of the ultrasonic fingerprint sensor. In one embodiment, the sequence of images includes images of the finger contacting a contact surface of the ultrasonic fingerprint sensor. It should be appreciated that the sequence of images can include images of the finger contacting the contact surface of the ultrasonic fingerprint sensor and separating from the contact surface of the ultrasonic fingerprint sensor.

At procedure 920, a plurality of transient features of the finger is extracted from the sequence of images. In some embodiments, as shown at procedure 922, extracting the plurality of transient features of the finger from the sequence of includes extracting the plurality of transient features of the finger from the sequence of images at pixels of the sequence of images that satisfy a signal change criteria. In one embodiment, as shown at procedure 924, the pixels of the sequence of images exhibiting signal changes relative to other pixels exceeding a change threshold include pixels at ridges of the fingerprint. In other embodiments, extracting the plurality of transient features of the finger from the sequence of includes extracting the plurality of transient features of the finger from the sequence of images at pixels corresponding to a ridge of the fingerprint.

In some embodiments, the plurality of transient features includes at least one transient signal feature. In some embodiments, the plurality of transient features includes at least one transient spatial feature. In some embodiments, the at least one transient spatial feature includes a transient fingerprint pattern feature. In some embodiments, the at least one transient spatial feature includes a transient contact pattern feature. In some embodiments, at least one transient feature of the plurality of transient features is related to a deformation of the finger.

At procedure 930, a classifier is applied to the plurality of transient features to classify the finger as one of a real finger and a fake finger. In some embodiments, each transient feature of the plurality of transient features is a feature vector of the classifier. In some embodiments, the classifier is constrained to considering the finger for an enrolled user. At procedure 940, it is determined whether the finger is a real finger based at least in part on output of the classifier. In some embodiments, the output of the classifier includes a probability whether the finger is a real finger or a fake finger.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for determining whether a finger is a real finger at an ultrasonic fingerprint sensor, the method comprising:

capturing a sequence of images of a fingerprint of a finger at an ultrasonic fingerprint sensor, wherein the sequence of images comprises a plurality of images captured during a change in contact state between the finger and the ultrasonic fingerprint sensor, the plurality of images comprising one of images captured during an instance of the finger initiating contact with a contact surface of the ultrasonic fingerprint sensor and images captured during an instance of the finger separating from the contact surface of the ultrasonic fingerprint sensor;

extracting a plurality of transient features of the finger from the sequence of images;

applying a classifier to the plurality of transient features to classify the finger as one of a real finger and a fake finger; and determining whether the finger is a real finger based on an output of the classifier.

2. The method of claim 1, wherein the extracting the plurality of transient features of the finger from the sequence of images comprises:

extracting the plurality of transient features of the finger from the sequence of images at pixels of the sequence of images that satisfy a signal change criteria.

3. The method of claim 2, wherein the pixels of the sequence of images exhibiting signal changes relative to other pixels exceeding a change threshold comprise pixels at ridges of the fingerprint.

4. The method of claim 1, wherein the extracting the plurality of transient features of the finger from the sequence of images comprises:
extracting the plurality of transient features of the finger from the sequence of images at pixels corresponding to a ridge of the fingerprint.

5. The method of claim 1, wherein each transient feature of the plurality of transient features is a feature vector of the classifier.

6. The method of claim 1, wherein the output of the classifier comprises a probability whether the finger is a real finger or a fake finger.

7. The method of claim 1, wherein the classifier is constrained to considering the finger for an enrolled user.

8. The method of claim 1, wherein the plurality of transient features comprises at least one transient signal feature.

9. The method of claim 1, wherein the plurality of transient features comprises at least one transient spatial feature.

10. The method of claim 9, wherein the at least one transient spatial feature comprises a transient fingerprint pattern feature.

11. The method of claim 9, wherein the at least one transient spatial feature comprises a transient contact pattern feature.

12. The method of claim 1, wherein at least one transient feature of the plurality of transient features is related to a deformation of the finger.

13. An ultrasonic fingerprint sensor device comprising:
a two-dimensional array of ultrasonic transducers; and
a processor, wherein the processor is configured to:
capture a sequence of images of a fingerprint of a finger at a fingerprint sensor, wherein the sequence of images comprises a plurality of images captured during a change in contact state between the finger and the ultrasonic fingerprint sensor device, the plurality of images comprising one of images captured during an instance of the finger initiating contact with a contact surface of the ultrasonic fingerprint sensor device and images captured during an instance of the finger separating from the contact surface of the ultrasonic fingerprint sensor device;
extract a plurality of transient features of the finger from the sequence of images;
apply a classifier to the plurality of transient features to classify the finger as one of a real finger and a fake finger; and
determine whether the finger is a real finger based at least in part on an output of the classifier.

14. The ultrasonic fingerprint sensor device of claim 13, wherein the processor is further configured to:
extract the plurality of transient features of the finger from the sequence of images at pixels of the sequence of images that satisfy a signal change criteria.

15. The ultrasonic fingerprint sensor device of claim 13, wherein the processor is further configured to:
extract the plurality of transient features of the finger from the sequence of images at pixels corresponding to a ridge of the fingerprint.

16. The ultrasonic fingerprint sensor device of claim 13, wherein the plurality of transient features comprises at least one transient signal feature or at least one transient spatial feature.

17. A non-transitory computer readable storage medium having computer readable program code stored thereon for causing a computer system to perform a method for determining whether a finger is a real finger at a fingerprint sensor, the method comprising:
capturing a sequence of images of a fingerprint of a finger at an ultrasonic fingerprint sensor, wherein the sequence of images comprises a plurality of images captured during a change in contact state between the finger and the ultrasonic fingerprint sensor, the plurality of images comprising one of images captured during an instance of the finger initiating contact with a contact surface of the ultrasonic fingerprint sensor and images captured during an instance of the finger separating from the contact surface of the ultrasonic fingerprint sensor;
extracting a plurality of transient features of the finger from the sequence of images;
applying a classifier to the plurality of transient features to classify the finger as one of a real finger and a fake finger; and
determining whether the finger is a real finger based on an output of the classifier.

* * * * *